(12) United States Patent
Hisazumi et al.

(10) Patent No.: US 9,283,995 B2
(45) Date of Patent: Mar. 15, 2016

(54) VEHICLE FRONT STRUCTURE

(71) Applicant: HONDA MOTOR CO., LTD., Minato-ku, Tokyo (JP)

(72) Inventors: Makoto Hisazumi, Wako (JP); Harumasa Toyosawa, Wako (JP); Hiroyoshi Horibe, Wako (JP); Masaaki Ukita, Wako (JP); Yoshiyuki Toba, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/390,233

(22) PCT Filed: Jan. 8, 2013

(86) PCT No.: PCT/JP2013/050098
§ 371 (c)(1),
(2) Date: Oct. 2, 2014

(87) PCT Pub. No.: WO2013/150806
PCT Pub. Date: Oct. 10, 2013

(65) Prior Publication Data
US 2015/0175216 A1    Jun. 25, 2015

(30) Foreign Application Priority Data

Apr. 5, 2012 (JP) ................................ 2012-086366
Apr. 5, 2012 (JP) ................................ 2012-086389
Apr. 5, 2012 (JP) ................................ 2012-086422

(51) Int. Cl.
| | | |
|---|---|---|
| B62D 21/15 | (2006.01) | |
| B62D 25/14 | (2006.01) | |
| B62D 25/08 | (2006.01) | |
| B62D 25/16 | (2006.01) | |
| B62D 27/02 | (2006.01) | |

(52) U.S. Cl.
CPC ............ *B62D 25/145* (2013.01); *B62D 25/081* (2013.01); *B62D 25/082* (2013.01); *B62D 25/088* (2013.01); *B62D 25/14* (2013.01); *B62D 25/16* (2013.01); *B62D 27/023* (2013.01)

(58) Field of Classification Search
CPC .... B62D 25/082; B62D 21/15; B62D 21/152; B62D 21/155; B62D 25/085; B62D 25/081; B62D 25/088; B62D 25/14; B62D 25/145; B62D 25/16; B62D 27/023; B60N 2/4235
USPC ............... 296/193.09, 187.08, 187.09, 187.1, 296/203.1, 68.1; 180/271, 274; 280/784; 297/216.18
See application file for complete search history.

(56) References Cited

U.S. PATENT DOCUMENTS 7,469,956 B2 * 12/2008 Yasuhara et al. ......... 296/187.09
8,118,349 B2 *  2/2012 Kihara et al. ............ 296/187.09

(Continued)

FOREIGN PATENT DOCUMENTS

JP      2000-177638 A    6/2000
JP      4432884 B2       3/2010

(Continued)

*Primary Examiner* — Glenn Dayoan
*Assistant Examiner* — Sunsurraye Westbrook
(74) *Attorney, Agent, or Firm* — Carrier Blackman & Associates, P.C.; Joseph P. Carrier; William D. Blackman

(57) ABSTRACT

A dashboard upper panel is provided with: a front vertical wall extending substantially vertically in a vehicle top/bottom direction; a horizontal bottom wall extending substantially horizontally in a vehicle front/rear direction from the front vertical wall; a rear inclined wall extending from the horizontal bottom wall toward the rear of the vehicle and diagonally toward the top of the vehicle; a front horizontal flange extending from the front vertical wall toward the front of the vehicle; and a rear horizontal flange extending from the rear inclined wall toward the rear of the vehicle. A dashboard lower panel is provided with an inclined flange formed at an upper end of the dashboard lower panel. By joining the inclined flange to a lower portion of the rear inclined wall, the dashboard upper panel is supported by the dashboard lower panel from below at substantially the center in the vehicle front/rear direction.

17 Claims, 35 Drawing Sheets

(56) References Cited

U.S. PATENT DOCUMENTS

2006/0006699 A1* 1/2006 Matsuyama et al. ..... 296/203.02
2013/0241233 A1* 9/2013 Ohnaka et al. ............. 296/187.1

FOREIGN PATENT DOCUMENTS

| JP | 2012-001005 A | 1/2012 |
| JP | 2012-006537 A | 1/2012 |

* cited by examiner

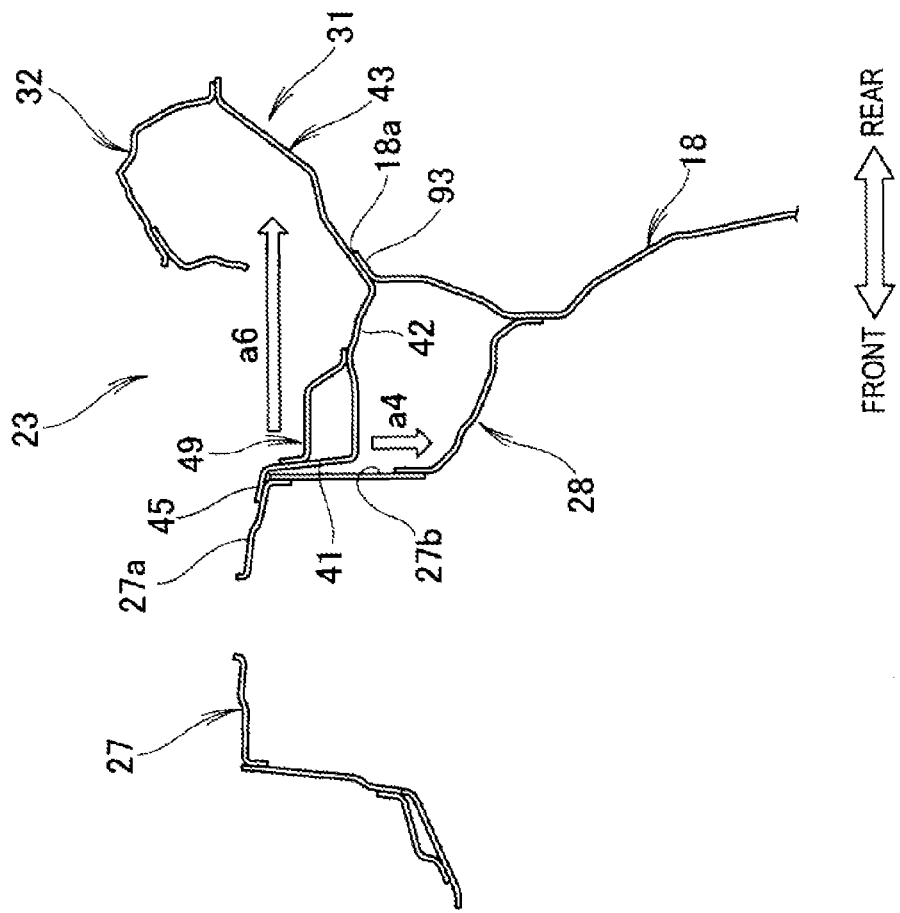
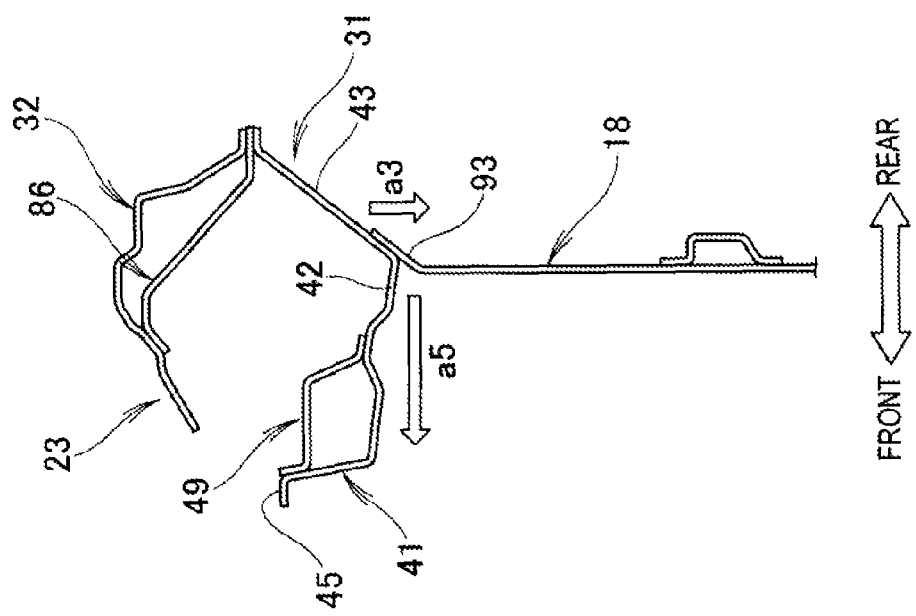

VEHICLE FRONT STRUCTURE

TECHNICAL FIELD

The present invention relates to a vehicle front structure including a dashboard lower panel having opposite ends in a vehicle width direction joined to left and right front pillars, a dashboard upper panel mounted on an upper part of the dashboard lower panel, and left and right damper housings provided forward of the dashboard lower panel.

BACKGROUND ART

A vehicle front structure is disclosed, for example, in Patent Literature 1, which includes a dash panel that partitions a cabin and a space located forward of the cabin, a cowl member disposed above the dash panel and extending between front pillars located at opposite ends in a vehicle width direction of a vehicle body, and connecting members for connecting an upper end of the dash panel and a lower end of the cowl member at opposite ends thereof in the vehicle width direction, each of the connecting members being inclined to have its upper end located forward of its lower end.

According to the vehicle front structure, since the cowl member (dashboard upper panel) and the dash panel (dashboard lower panel) are joined together at the opposite ends thereof in the vehicle width direction via the connecting members, the shapes and positions of the front pillars are hardly restricted even though the cowl member is mounted to extend therebetween.

In the vehicle front structure disclosed in Patent Literature 1, however, the dash panel (dashboard lower panel) is joined to a rear end of the cowl member (dashboard upper panel), and thus vibration generated due to inward falling of damper housings during traveling is transmitted from the cowl member to the dash panel without being attenuated. It is therefore needed to reinforce the dash panel for suppressing vibration.

Further, it is desired that such a vehicle front structure is capable of preventing intrusion of water into the cabin from the cowl member (dashboard upper panel), while improving mounting property of the cowl member (dashboard upper panel) and welding workability of a vehicle front part.

PRIOR ART LITERATURE

Patent Literature

Patent Literature 1: Japanese Patent No. 4432884

SUMMARY OF INVENTION

Technical Problems

It is therefore a first object of the present invention to provide a vehicle front structure which can reduce vibration transmitted to a dashboard lower panel and hence vibration inside a cabin. It is a second object of the present invention to provide a vehicle front structure which can securely prevent intrusion of water into the cabin from a dashboard upper panel. Further, it is a third object of the present invention to provide a vehicle front structure which can improve mounting property of the dashboard upper panel, and also improve welding workability of a vehicle front part.

Solutions to Problems

According to the invention as defined in claim 1, there is provided a vehicle front structure comprising: a dashboard lower panel having opposite ends in a vehicle width direction joined to left and right front pillars; a dashboard upper panel mounted on an upper part of the dashboard lower panel; and left and right damper housings provided forward of the dashboard lower panel, wherein the dashboard upper panel includes: a front vertical wall extending substantially vertically in a height direction of a vehicle body; a horizontal bottom wall extending from a lower end of the front vertical wall substantially horizontally in a longitudinal direction of the vehicle body; and a rear inclined wall extending obliquely upward and rearward from a rear end of the horizontal bottom wall, wherein the dashboard lower panel includes: a vertical wall; and an inclined flange formed at an upper end of the vertical wall, and wherein the inclined flange is joined to a lower part of the rear inclined wall so that the dashboard upper panel is supported at substantially a center thereof in the longitudinal direction of the vehicle body from below by the vertical wall.

Preferably, as defined in claim 2, the dashboard lower panel includes side edge flanges joined to front-pillar inner panels of the front pillars, and the inclined flange is formed continuously with the side edge flanges so as to form an L-shaped waterproof wall at each of corner parts of the dashboard lower panel.

Preferably, as defined in claim 3, the dashboard upper panel is configured so that, when being mounted on the dashboard lower panel and the left and right damper housings from above, the rear inclined wall abuts on the inclined flange, and the front vertical wall and a front horizontal flange extending forward from an upper end of the front vertical wall abut respectively on rear walls and upper walls of the damper housings.

Preferably, as defined in claim 4, the dashboard upper panel is provided with a windshield lower support member for supporting a windshield, the dashboard upper panel and the windshield lower support member together forming an opening opened forward and upward, and the dashboard upper panel and the windshield lower support member are formed in such a shape that a first welding gun is allowed to be inserted from the opening, while a second welding gun is brought close to the first welding gun from behind the rear inclined wall, to thereby weld together the rear inclined wall and the inclined flange from both sides.

As defined in claim 5, the vehicle front structure further comprises wheel houses mounted below the damper housings to cover wheels, and preferably, each of opposite lateral ends of the dashboard upper panel forms a closed cross section together with the dashboard lower panel, a corresponding one of the damper housings, and a corresponding one of the wheel houses.

As defined in claim 6, the vehicle front structure further comprises: a cowl top mounted on an upper front part of the dashboard upper panel to form a space section extending in the vehicle width direction; and a cowl reinforcing member provided within the space section to form a closed cross section extending in the vehicle width direction together with the front vertical wall and a front part of the horizontal bottom wall, and preferably, an upper edge of the dashboard lower panel is formed to fit along and joined to the rear inclined wall extending obliquely upward and rearward.

Preferably, as defined in claim 7, the dashboard lower panel has a brake master cylinder mounting part for mounting thereon a brake master cylinder, the dashboard upper panel has a recessed section formed in the horizontal bottom wall to be recessed upward above the brake master cylinder mounting part, and the cowl reinforcing member has a curved part located above the brake master cylinder mounting part and formed to curve upward, and a linear part located away from the brake master cylinder mounting part in the vehicle width direction and formed linearly, the linear part being formed of a plate thinner than the curved part.

Preferably, as defined in claim 8, the cowl reinforcing member is formed of a steel plate bent into an L shape having a reinforcing upper wall and a reinforcing rear wall, and has a front end flange extending from the reinforcing upper wall and a rear end flange extending from the reinforcing rear wall, the front end flange being joined to the front vertical wall, and the rear end flange being joined to the horizontal bottom wall, thereby forming the closed cross section.

Preferably, as defined in claim 9, the left and right damper housings for supporting damper units are provided forward of the dashboard lower panel, and opposite ends of the cowl reinforcing member in the vehicle width direction are joined to stiffeners mounted on the front vertical wall of the dashboard upper panel, respectively, and joined to the upper walls of the damper housings via the stiffeners.

Preferably, as defined in claim 10, a cowl opening reinforcing member for reinforcing the dashboard upper panel having a U-shaped cross section is attached to extend between the linear part of the cowl reinforcing member and the rear inclined wall of the dashboard upper panel.

Preferably, as defined in claim 11, wiper motor mounting brackets for mounting thereon a wiper motor are attached to extend between the curved part of the cowl reinforcing member and the rear inclined wall of the dashboard upper panel.

Preferably, as defined in claim 12, the dashboard lower panel is provided with a dashboard cross member mounted on a surface of the dashboard lower panel facing a cabin and extending in the vehicle width direction so that the dashboard lower panel and the dashboard cross member together form a closed cross section, and the dashboard cross member is joined to left and right wheel houses mounted on a surface of the dashboard lower panel facing an engine room with the dashboard lower panel sandwiched therebetween.

Preferably, as defined in claim 13, the dashboard lower panel includes wheel house parts formed in a curved shape bulging toward the cabin to have increased rigidity and constituting rear parts of the wheel houses, and the dashboard cross member is joined to the wheel house parts.

Preferably, as defined in claim 14, the dashboard lower panel is provided with, on one lateral side of the vehicle body, an accelerator pedal bracket for supporting an accelerator pedal, and a brake master cylinder mounting part for mounting thereon a brake master cylinder, and the dashboard cross member is joined at one end to a corresponding one of the wheel houses with at least either of the accelerator pedal bracket and the brake master cylinder mounting part interposed therebetween.

Preferably, as defined in claim 15, the dashboard lower panel is provided with, on the other lateral side of the vehicle body a brake master cylinder mounting part for mounting thereon a brake master cylinder, and, while the dashboard cross member is joined at one end to a corresponding one of the wheel houses, the dashboard cross member is joined at the other end to the other one of the wheel houses with the brake master cylinder mounting part interposed therebetween.

Preferably, as defined in claim 16, the dashboard lower panel is provided with a supporting bracket for supporting vehicle-mounted parts including a steering hanger and a parking pedal, and the dashboard cross member is connected with the dashboard upper panel via the supporting bracket.

Advantageous Effects of Invention

During traveling, the damper housings fall inward due to external force applied from the wheels, and vibration is generated due to the inward falling of the dumper housings. The vibration is transmitted to the dashboard upper panel (cowl member) that is joined to the damper housings, and then transmitted from the dashboard upper panel to the dashboard lower panel, thereby causing vibration inside the cabin. In the invention as defined in claim 1, by joining the inclined flange of the dashboard lower panel to the lower part of the rear inclined wall of the dashboard upper panel, the dashboard upper panel is supported at substantially the center thereof in the longitudinal direction of the vehicle body from below by the vertical wall of the dashboard lower panel. Thus, supporting stability of the dashboard upper panel can be increased, whereby vibration of the dashboard upper panel can be suppressed. By thus reducing vibration transmitted from the dashboard upper panel to the dashboard lower panel, vibration inside the cabin can be reduced. As a result, it is possible to improve quietness inside the cabin.

In the invention as defined in claim 2, the dashboard lower panel has the side edge flanges joined to the front-pillar inner panels of the front pillars, each of which is formed continuously with the inclined flange so as to form the L-shaped waterproof wall at each of the corner parts of the dashboard lower panel. With this configuration, intrusion of water into the cabin from the dashboard upper panel can be surely prevented.

In the invention as defined in claim 3, the dashboard upper panel is configured so that, when being mounted on the dashboard lower panel and the left and right damper housings from above, the rear inclined wall abuts on the inclined flange, and the front vertical wall and the front horizontal flange extending forward from the upper end of the front vertical wall abut respectively on the rear walls and the upper walls of the damper housings. In other words, when the dashboard upper panel is placed on the dashboard lower panel and the damper housings from above, with the inclined flange abutting on the rear inclined wall, rearward movement of the dashboard upper panel is restricted, and an urging force caused by gravity acts in a forward direction. Further, with the front vertical wall and the front horizontal flange abutting respectively on the rear walls and the upper walls of the damper housings, forward movement of the dashboard upper panel is restricted, whereby the dashboard upper panel is positioned. As a result, mounting property of the dashboard upper panel can be improved.

In the invention as defined in claim 4, the dashboard upper panel is provided with the windshield lower support member for supporting the windshield. The dashboard upper panel and the windshield lower support member together form the opening (hereinbelow referred to also as "cowl opening") opened forward and upward. The dashboard upper panel and the windshield lower support member are formed in such a shape that the first welding gun is allowed to be inserted from the cowl opening, while the second welding gun is brought close to the first welding gun from behind the rear inclined wall, to thereby weld together the rear inclined wall and the inclined flange from both sides. With this configuration, the dashboard upper panel and the windshield lower support member can be welded together by such a mass-producible welding method, and thus welding workability of a vehicle front part can also be improved.

In the invention as defined in claim 5, the wheel houses for covering the wheels are mounted below the damper housings, and each of the lateral opposite ends of the dashboard upper panel forms the closed cross section together with the dashboard lower panel, the corresponding one of the damper housings, and the corresponding one of the wheel houses, whereby the vehicle front part can have increased rigidity.

In the invention as defined in claim 6, the cowl top is mounted on the upper front part of the dashboard upper panel to form the space section extending in the vehicle width direction. The dashboard upper panel has the U-shaped cross section formed by the front vertical wall extending in the height direction of the vehicle body, the horizontal, bottom wall extending from the lower end of the front vertical wall in the longitudinal direction of the vehicle body, and the rear inclined wall extending obliquely upward and rearward from the rear end of the horizontal bottom wall. By providing the cowl reinforcing member within the space section to extend between the front vertical wall and the front part of the horizontal bottom wall, the closed cross section extending in the vehicle width direction is formed by the front vertical wall, the front part of the horizontal bottom wall, and the cowl reinforcing member, so that the rigidity of the vehicle body in the vehicle width direction can be increased. Further, since the cowl reinforcing member is formed in a simple shape, the productivity can be enhanced. Since the upper edge of the dashboard lower panel is formed to fit along and joined to the rear inclined wall extending obliquely upward and rearward, the projecting amount of the dashboard lower panel toward the engine room is reduced, so that maintenance property of the engine room can be improved, while expanding the space inside the cabin. Furthermore, with the space section formed to have a large size in the vertical direction, a sufficient intake air quantity to an air conditioner can be ensured.

In the invention as defined in claim 7, the dashboard lower panel has the brake master cylinder mounting part for mounting thereon the brake master cylinder, and the dashboard upper panel has the recessed section formed in the horizontal bottom wall to be recessed upward above the brake master cylinder mounting part. The cowl reinforcing member has the curved part located above the brake master cylinder mounting part and formed to curve upward, and the linear part located away from the brake master cylinder mounting part in the vehicle width direction and formed linearly. Since the strength and rigidity of the linear part are greater than those of the curved part, the linear part can be formed of a plate thinner than the curved part, which contributes to weight reduction of the vehicle body.

In the invention as defined in claim 8, the cowl reinforcing member is formed of a steel plate bent into the L shape having the reinforcing upper wall and the reinforcing rear wall, and has the front end flange extending from the reinforcing upper wall and the rear end flange extending from the reinforcing rear wall. The front end flange is joined to the front vertical wall, and the rear end flange is joined to the horizontal bottom wall, thereby forming the closed cross section. That is, with a corner section being formed by the reinforcing upper wall and the reinforcing rear wall of the cowl reinforcing member, the closed cross section can be formed in a simple shape by only a few members to thereby increase the strength and rigidity of the dashboard upper panel. As a result, the weight of the vehicle body can further be reduced, while increasing the strength and rigidity thereof at a low cost.

In the invention as defined in claim 9, the left and right damper housings for supporting the damper units are provided forward of the dashboard lower panel. The opposite ends of the cowl reinforcing member in the vehicle width direction are joined to the stiffeners mounted on the front vertical wall of the dashboard upper panel, respectively, and joined to the upper walls of the damper housings via the stiffeners, so that the vehicle body can have increased rigidity. Further, since there is no need to bend forward the opposite ends of the dashboard upper panel toward the upper walls of the damper housings in order to join the opposite ends thereto, reduction of the strength and rigidity of the dashboard upper panel can be suppressed, while facilitating the manufacture thereof.

In the invention as defined in claim 10, the cowl opening reinforcing member for reinforcing the dashboard upper panel having the U-shaped cross section is attached to extend between the linear part of the cowl reinforcing member and the rear inclined wall of the dashboard upper panel, so that the dashboard upper panel can have increased strength in the longitudinal direction of the vehicle body.

In the invention as defined in claim 11, the wiper motor mounting brackets for mounting thereon the wiper motor are attached to extend between the curved part of the cowl reinforcing member and the rear inclined wall of the dashboard upper panel, so that the dashboard upper panel can have further increased strength in the longitudinal direction of the vehicle body, while reinforcing the curved part of the cowl reinforcing member. As a result, it is also possible to make the cowl reinforcing member thinner.

In the invention as defined in claim 12, the dashboard lower panel is provided with the dashboard cross member mounted on the surface of the dashboard lower panel facing the cabin and extending in the vehicle width direction so that the dashboard lower panel and the dashboard cross member together form the closed cross section. With the closed cross section formed by the dashboard lower panel and the dashboard cross member, vibration transmitted from the damper housings to the dashboard lower panel via the wheel houses can be attenuated. Further, the dashboard cross member is joined to the wheel houses with the dashboard lower panel sandwiched therebetween, so that vibration of the wheel houses can be suppressed. By thus reducing vibration transmitted from the wheel houses to the dashboard lower panel, noise inside the cabin can be reduced. As a result, it is possible to improve quietness inside the cabin.

In the invention as defined, in claim 13, the dashboard lower panel includes the wheel house parts formed in the curved shape bulging toward the cabin to have increased rigidity and constituting the rear parts of the wheel houses. Since the dashboard cross member is joined to the wheel house parts having increased rigidity, predetermined strength and rigidity of the vehicle front part can be ensured without elongating the dashboard cross member to reach the front pillars. Thus, the dashboard cross member can be shortened and the weight of the vehicle front part can thereby be reduced, while increasing the strength and rigidity of the wheel house parts.

In the invention as defined in claim 14, the dashboard lower panel is provided with, on the one lateral side of the vehicle body, the accelerator pedal bracket for supporting the accelerator pedal, and the brake master cylinder mounting part for mounting thereon the brake master cylinder. Since the dashboard cross member is joined at the one end to the corresponding one of the wheel houses with at least either of the accelerator pedal bracket and the brake master cylinder mounting part interposed therebetween, the dashboard cross member can be further shortened and the weight of the vehicle front part can be further reduced.

In the invention as defined in claim 15, the dashboard lower panel is provided with, on the other lateral side of the vehicle body, the brake master cylinder mounting part for mounting thereon the brake master cylinder. While the dashboard cross member is joined at the one end to the corresponding one of the wheel houses, the dashboard cross member is joined at the other end to the other one of the wheel houses with the brake master cylinder mounting part interposed therebetween. Thus, there is no need to elongate the other end of the dashboard cross member to reach the corresponding front pillar, and therefore the weight of the vehicle front part can be further reduced.

In the invention as defined in claim 16, the dashboard upper panel is mounted on the upper part of the dashboard lower panel, and the dashboard lower panel is provided with the supporting bracket for supporting the vehicle-mounted parts including the steering hanger and the parking pedal. By connecting the dashboard cross member with the dashboard upper panel via the supporting bracket, the dashboard cross member is reinforced by the supporting bracket. Thus, it is also possible to make the dashboard cross member thinner, which contributes to weight reduction of the vehicle front part.

BRIEF DESCRIPTION OF DRAWINGS

FIGS. 11(a) and 11(b) are views showing how the dashboard lower panel, the dashboard upper panel, and the damper housing of FIG. 6 are joined to one another;

DESCRIPTION OF EMBODIMENTS

Certain preferred embodiments of the present invention will be described in detail below with reference to the accompanying drawings.

Embodiment

Figure 1:
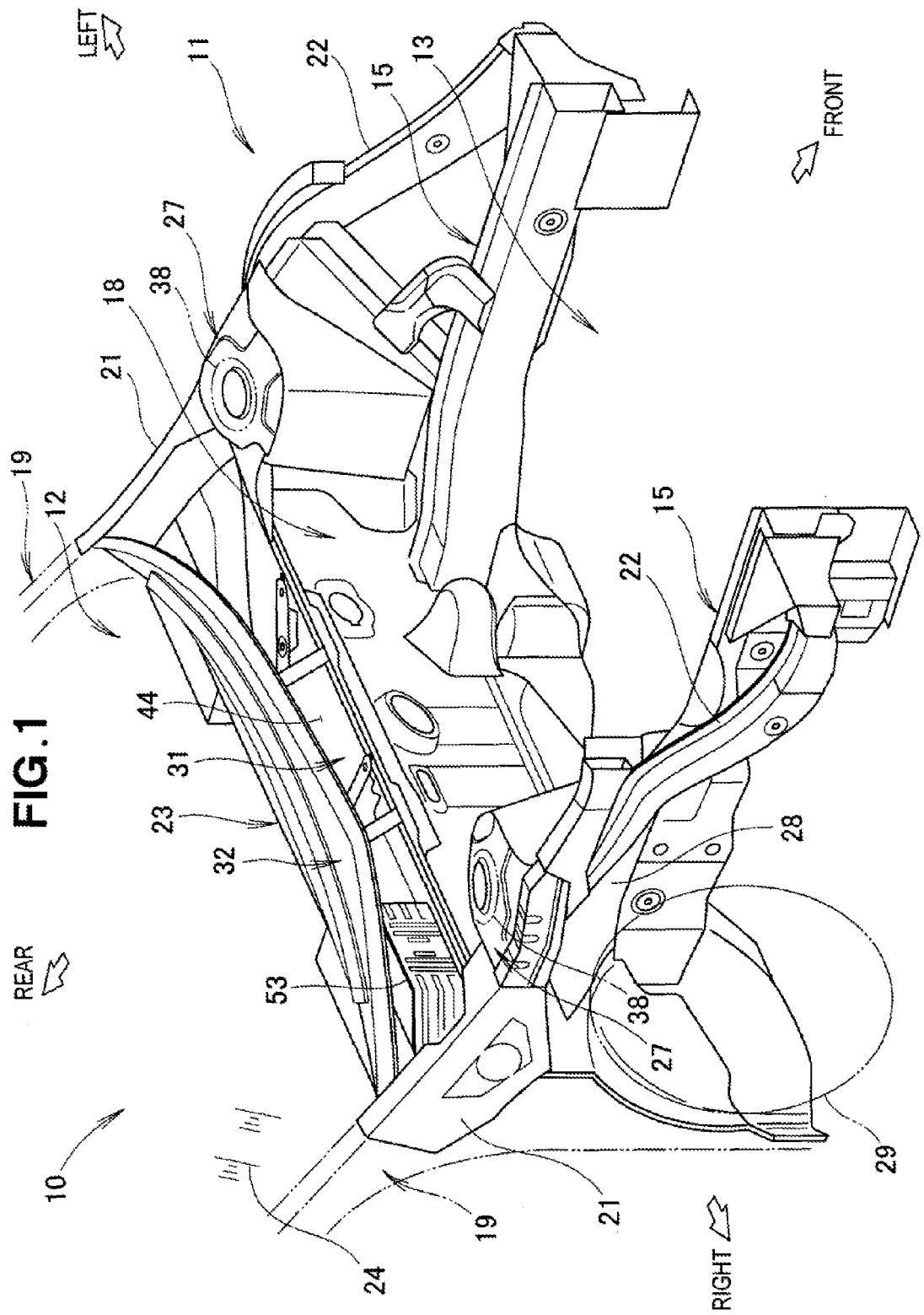
FIG. 1 is a perspective view showing a vehicle front structure according to the present invention.
Figure 5:
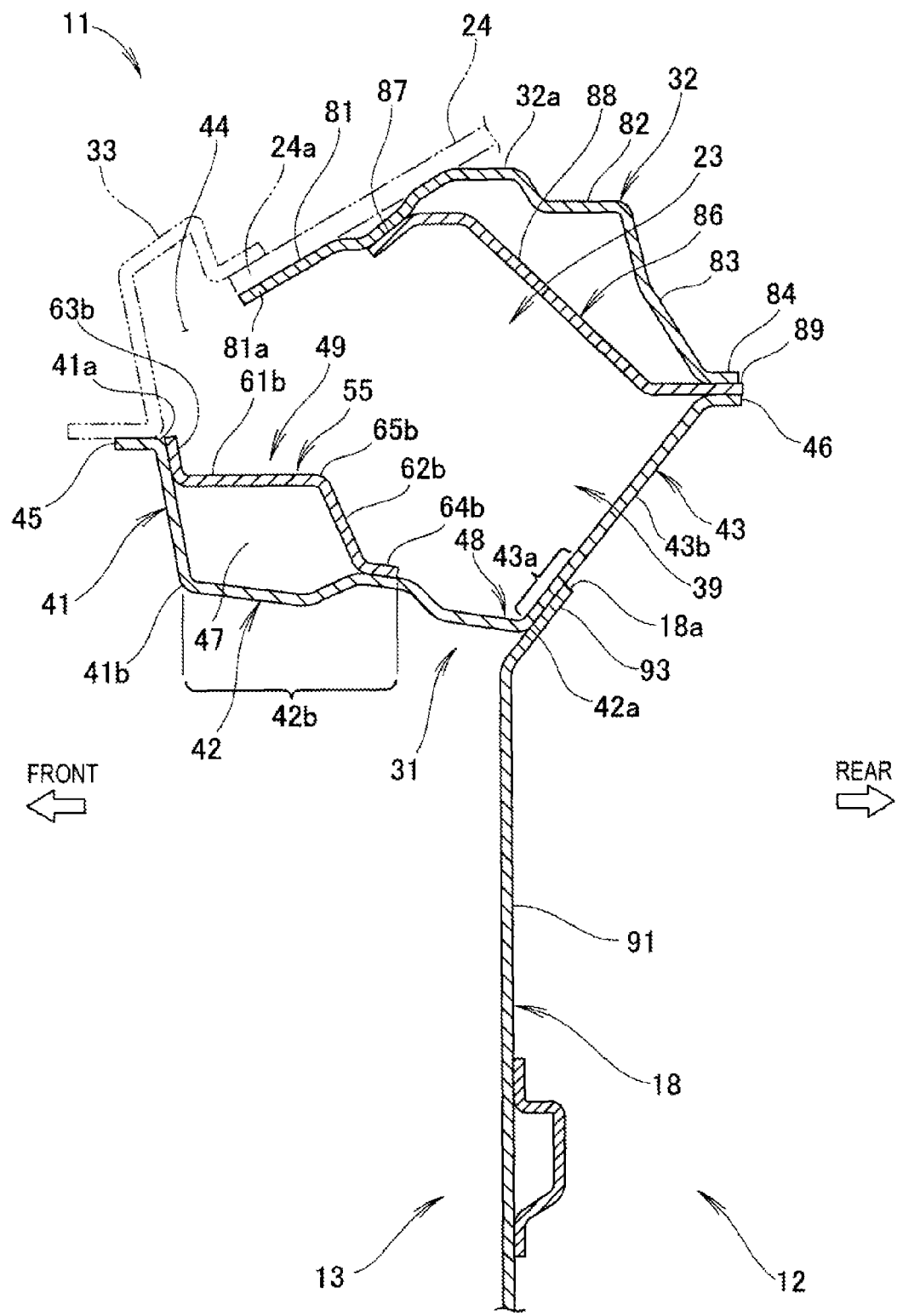
FIG. 5 is an enlarged cross-sectional view taken along line 5-5 of FIG. 2.
Figure 6:
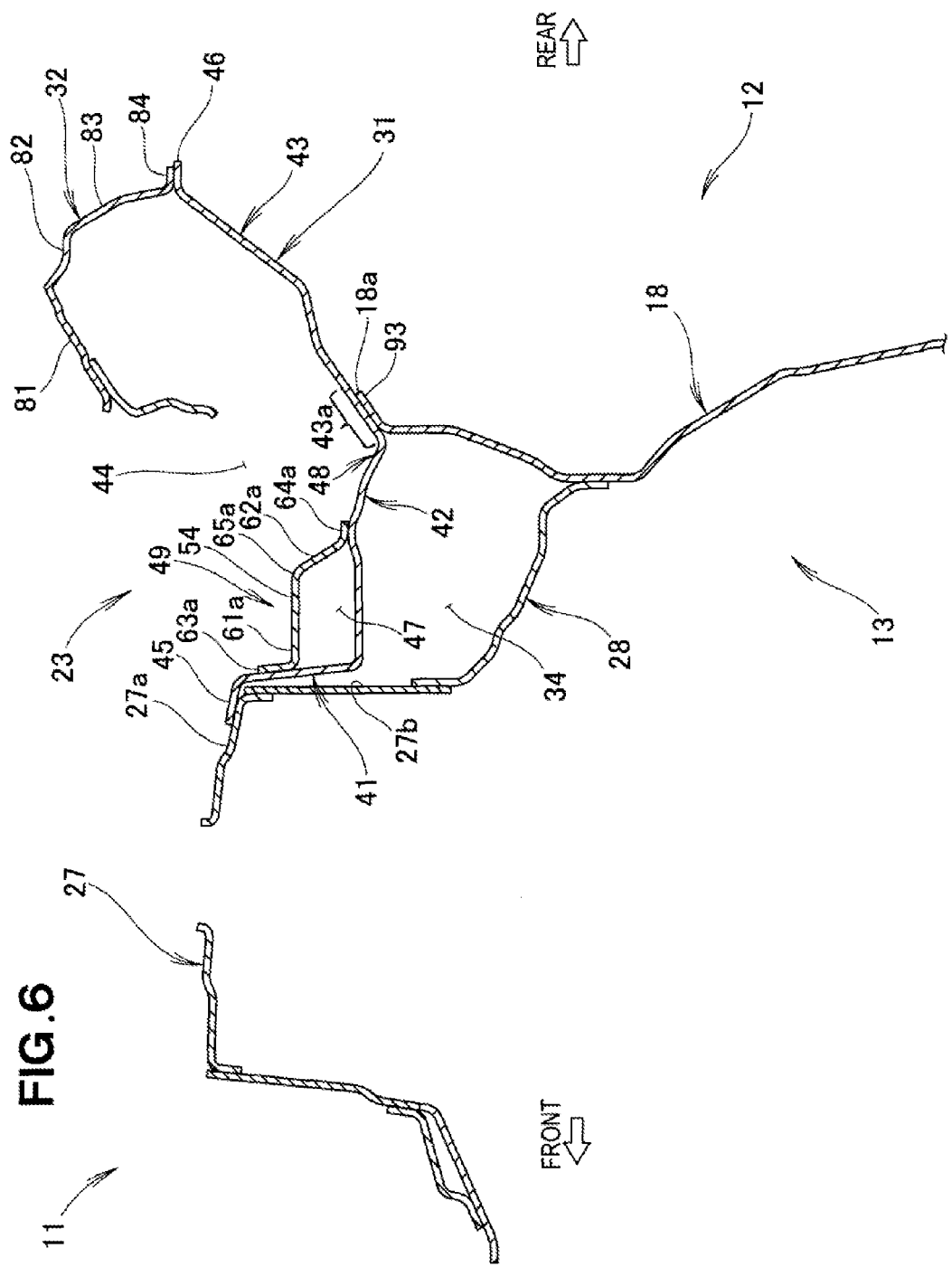
FIG. 6 is an enlarged cross-sectional view taken along line 6-6 to of FIG. 2.

As shown in FIGS. 1, 5, and 6, a vehicle front structure according to the first embodiment includes a dashboard upper panel 31 having a rear inclined wall 43, and a dashboard lower panel 18 having an inclined flange 93. By joining the inclined flange 93 to a lower portion or lower part 43a of the rear inclined wall 43, the dashboard upper panel 31 is supported at substantially a center thereof in a vehicle front/rear direction or longitudinal direction of a vehicle body from below by the dashboard lower panel 18, and thus supporting stability of the dashboard upper panel 31 is increased.

Figure 7:
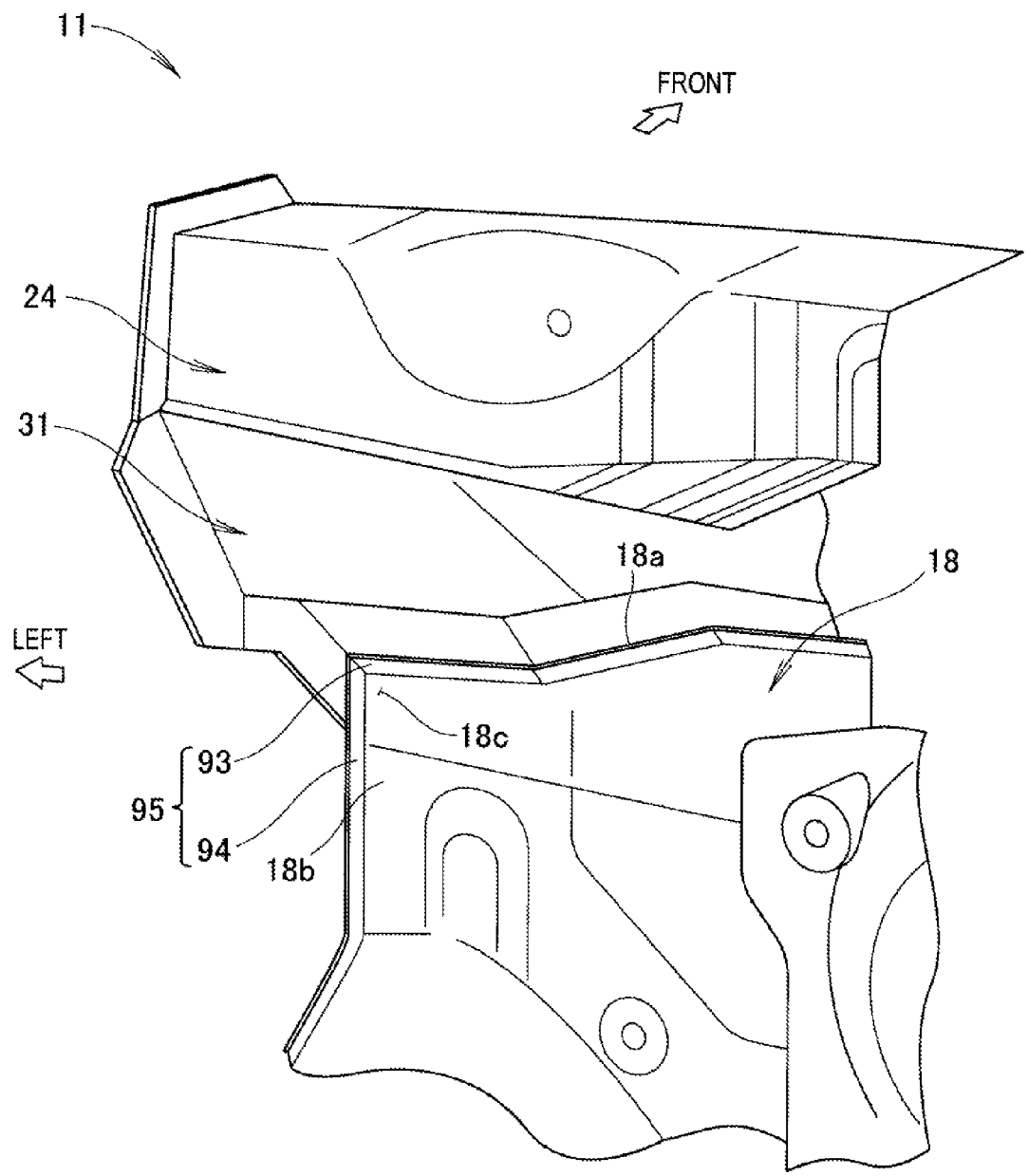
FIG. 7 is an enlarged view of section 7 of FIG. 4.

As shown in FIG. 7, in the vehicle front structure, the dashboard lower panel 18 has side edge flanges 94, 94, each of which is formed continuously with the inclined flange 93 so as to form an L-shaped waterproof wall 95 at each of corner parts 18c, 18c of the dashboard lower panel 18, thereby improving waterproof property to prevent intrusion of water from the dashboard upper panel 31. Further, with the inclined flange 93 of the dashboard lower panel 18, mounting property of the dashboard upper panel (as a cowl member) 31 is improved.

As shown in FIG. 1, a vehicle 10 includes, in a front part of a vehicle body 11, left and right front side frames 15, 15 extending in the longitudinal direction of the vehicle body, the dashboard lower panel 18 that partitions the vehicle body in the longitudinal direction thereof, left and right front pillars 19, 19 mounted on opposite lateral sides of the dashboard lower panel 18, left and right upper members (apron reinforcements) 21, 21 extending forward and rearward from the front pillars 19, 19, left and right lower members 22, 22 extending obliquely forward and downward from the upper members 21, 21, a cowl box (space section) 23 (see FIG. 5) mounted on an upper part of the dashboard lower panel 18, a windshield 24 supported at a lower end 24a thereof by the cowl box 23, left and right damper housings 27, 27 for supporting damper units 38, 38, and left and right wheel houses 28, 28 mounted below the damper housings 27, 27 to cover wheels 29, 29. The vehicle 10 is a left-hand drive vehicle.

Figure 4:
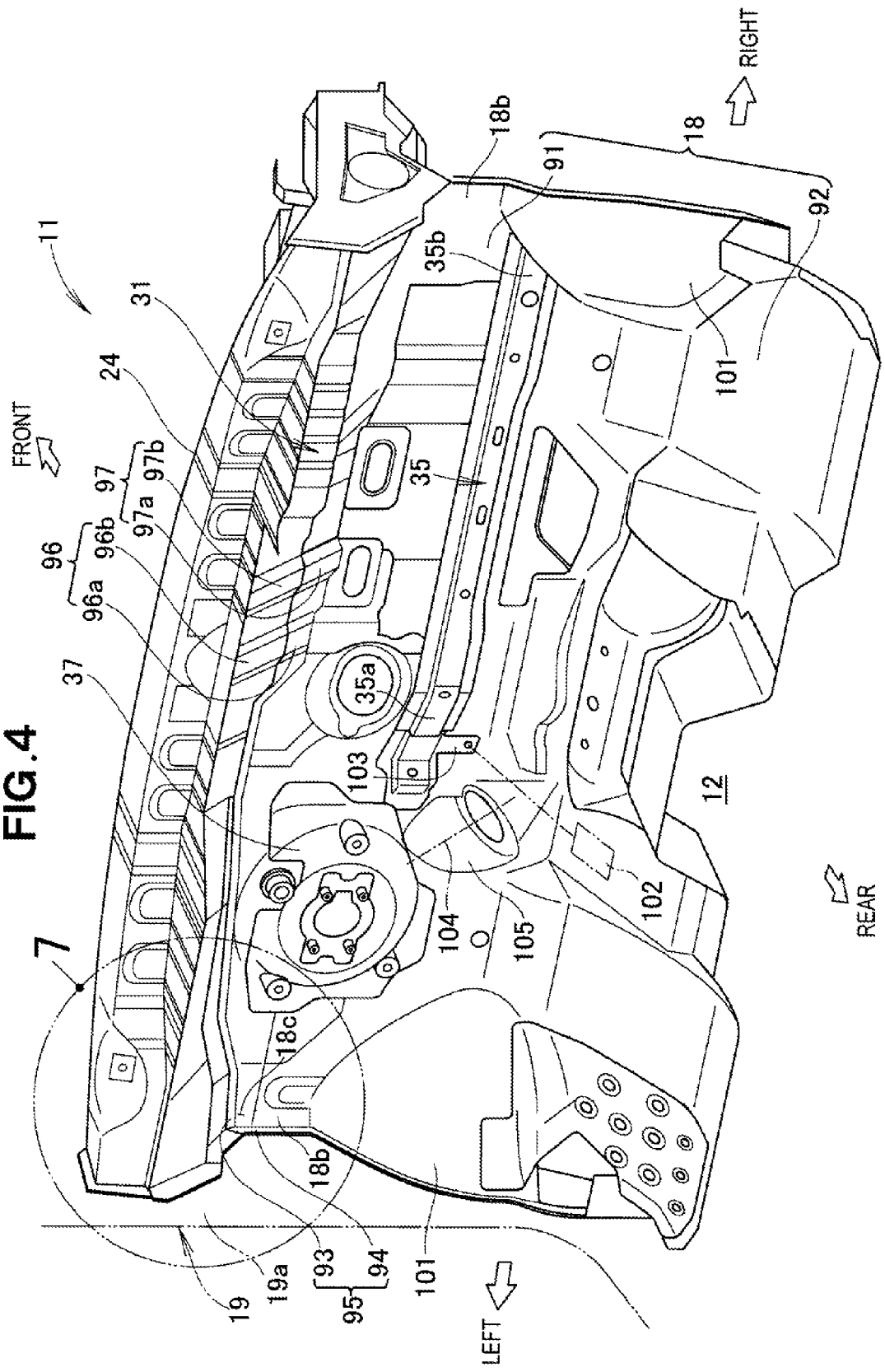
FIG. 4 is a perspective view of the vehicle front structure of FIG. 1 as viewed from a cabin side.

As shown in FIG. 4, the dashboard lower panel 18 has opposite ends 18b, 18b in a vehicle width direction joined to the left and right front pillars 19, 19. The dashboard lower panel 18 partitions a cabin 12 and an engine room 13. The dashboard lower panel 18 includes a vertical wall 91 extending vertically in the vehicle body 11, and an inclined surface 92 extending obliquely rearward and downward from the vertical wall 91.

Figure 2:
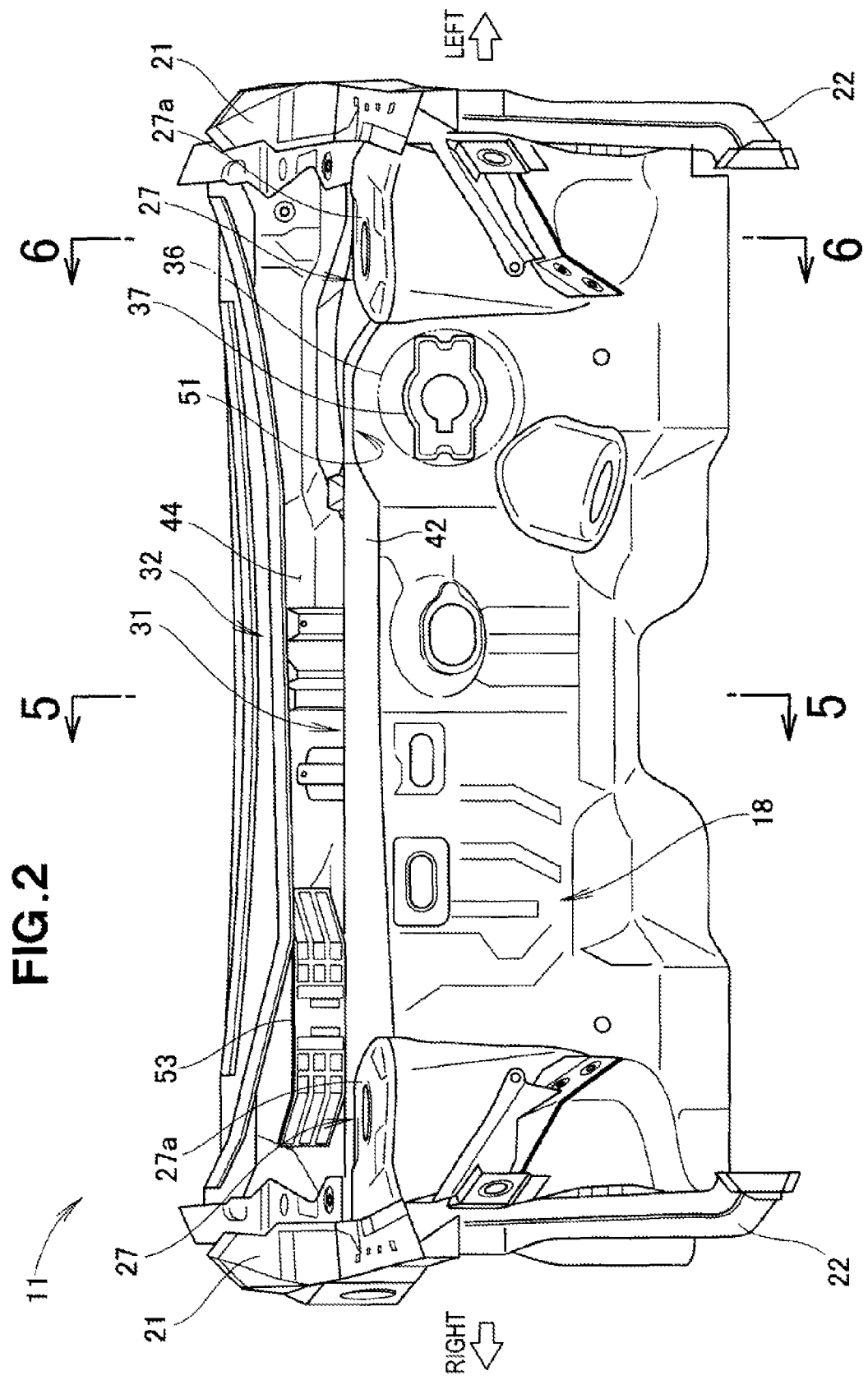
FIG. 2 is a front view of the vehicle front structure of FIG. 1.
Figure 3:
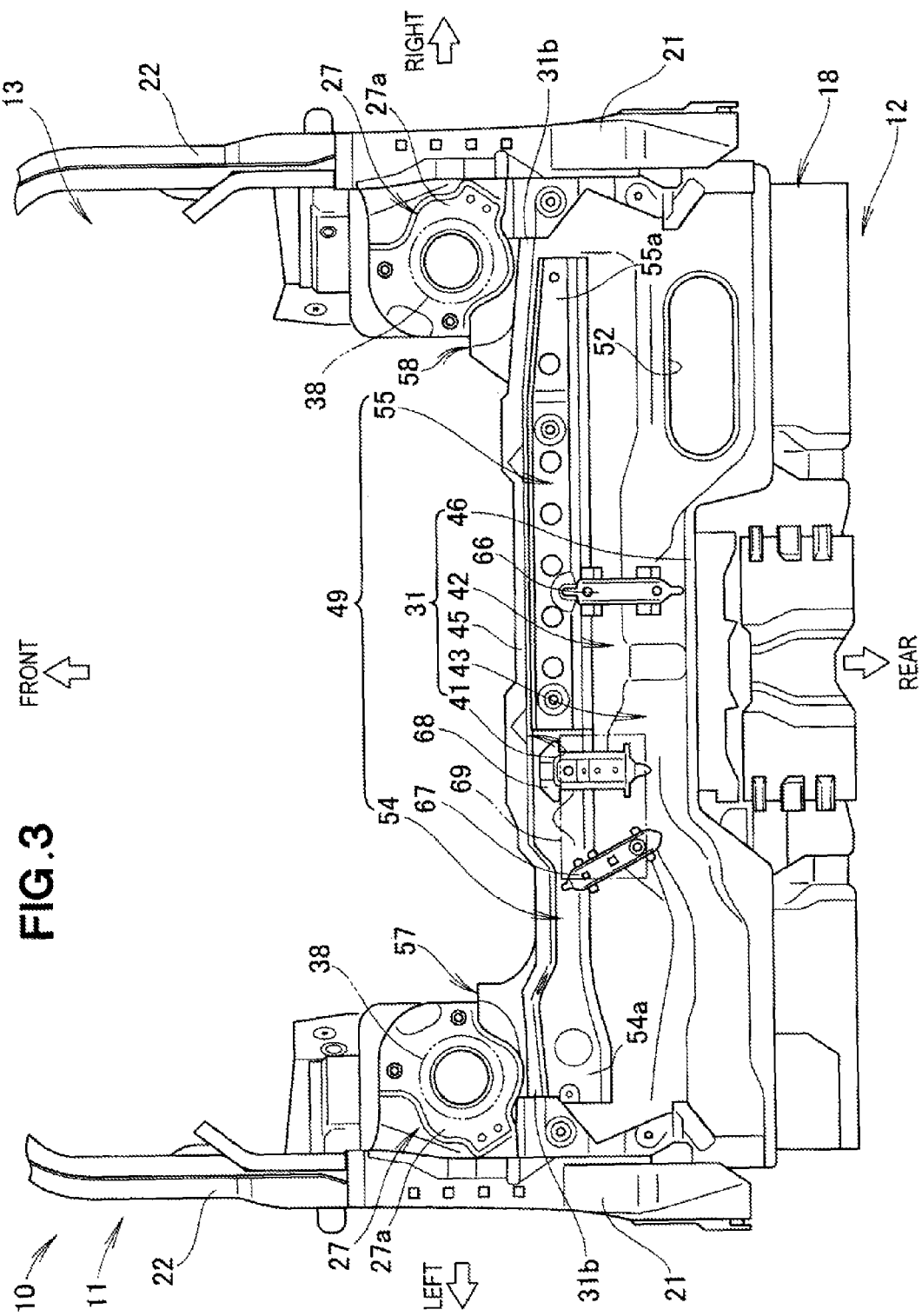
FIG. 3 is a plan view of the vehicle front structure of FIG. 1.

As shown in FIG. 2, the dashboard lower panel 18 has a brake master cylinder mounting part 37 for mounting thereon a brake master cylinder 36. As shown in FIGS. 4 and 5, the dashboard lower panel 18 has the inclined flange 93 formed at an upper end 18a thereof, and the side edge flanges 94, 94 joined to front-pillar inner panels 19a, 19a of the front pillars 19, 19. As shown in FIG. 3, the left and right damper housings 27, 27 are provided forward of the dashboard lower panel 18.

As shown in FIG. 5, the cowl box 23 is composed of the dashboard upper panel 31, a windshield lower support member 32, and a cowl top 33, whereby a space section extending in the vehicle width direction is formed thereinside. More specifically, the cowl box 23 has a cowl opening 44 formed between an upper end 41a of a front vertical wall 41 of the dashboard upper panel 31 and a distal end 81a of a windshield supporting surface 81 of the windshield lower support member 32, and the cowl opening 44 is covered by the cowl top 33, which is formed of resin.

FIG. 5 is a cross-sectional view of the cowl box 23 at a laterally central part thereof, and FIG. 6 is a cross-sectional view of the cowl box 23 at a lateral end part thereof. As shown in FIGS. 5 and 6, the dashboard upper panel 31 is mounted on the upper part of the dashboard lower panel 18.

The dashboard upper panel 31 has the front vertical wall 41 extending substantially vertically in a vehicle top/bottom direction or height direction of the vehicle body, a horizontal bottom wall 42 extending from a lower end 41b of the front vertical wall 41 substantially horizontally in the longitudinal direction of the vehicle body, the rear inclined wall 43 extending obliquely upward and rearward from a rear end 42a of the horizontal bottom wall 42, a front horizontal flange 45 extending forward from the front vertical wall 41, and a rear horizontal flange 46 extending rearward from the rear inclined wall 43.

The inclined flange 93 of the dashboard lower panel 18 is joined to the lower part 43a of the rear inclined wall 43. The dashboard upper panel 31 is thereby supported at substantially the center thereof in the longitudinal direction of the vehicle body from below by the dashboard lower panel 18. As shown in FIG. 6, each of opposite lateral ends 31b, 31b (FIG. 3) of the dashboard upper panel 31 forms a closed cross section 34 together with the dashboard lower panel 18, a corresponding one of the damper housings 27, 27, and a corresponding one of the wheel houses 28, 28.

As shown in FIG. 5, the dashboard upper panel 31 is provided with the windshield lower support member 32 for supporting the lower end 24a of the windshield 24. The dashboard upper panel 31 and the windshield lower support member 32 together form the cowl opening 44 opened forward and upward.

The dashboard upper panel 31 is formed in a simple shape having a substantially U-shaped cross section opened upward, so that the productivity can be enhanced. Further, by being formed in such a shape, the dashboard upper panel 31 can form together with the windshield lower support member 32 an outside air introduction passage 39 for introducing outside air to an air conditioner (air conditioning apparatus, not shown) with a large cross section, thereby increasing an intake air quantity to the air conditioner.

The dashboard upper panel 31 is provided with an L-shaped cowl reinforcing member 49 mounted within the cowl box 23 to extend between the front vertical wall 41 and a front part 42b of the horizontal bottom wall 42. The front vertical wall 41, the front part 42b of the horizontal bottom all 42, and the cowl reinforcing member 49 together form a closed cross section 47 extending in the vehicle width direction.

The dashboard upper panel 31 has a drain passage 48 formed thereon for discharging rainwater. More specifically, the drain passage 48 is a groove having a U-shaped cross section formed by the front vertical wall 41, the horizontal bottom wall 42, and the rear inclined wall 43.

As shown in FIG. 2, the dashboard upper panel 31 has a recessed section 51 formed in the horizontal bottom wall 42 to be recessed upward above the brake master cylinder mounting part 37. As shown in FIG. 3, the dashboard upper panel 31 further has an air-conditioner air intake port 52 formed therein for taking in outside air to the air conditioner (air conditioning apparatus, not shown). With the air-conditioner air intake port 52, outside air is taken into the air conditioner via the outside air introduction passage 39 (FIG. 5). A throating plate 53 (FIG. 1) is provided forward of the air-conditioner air intake port 52 to prevent rainwater from entering thereinto.

During traveling, the damper housings 27 fall inward due to external force applied from the wheels 29 (FIG. 1), and vibration is generated due to the inward falling of the damper housings 27. The vibration is transmitted to the dashboard upper panel 31 that is joined to the damper housings 27, and then transmitted from the dashboard upper panel 31 to the dashboard lower panel 18, thereby causing vibration inside the cabin 12.

In the vehicle front structure according to the present invention, the dashboard upper panel 31 is supported by the dashboard lower panel 18 at the lower part 43a of the rear inclined wall 43, which is corresponding to substantially the center of the dashboard upper panel 31 in the longitudinal direction of the vehicle body so that vibration of the dashboard upper panel 31 can be attenuated. Since vibration of the dashboard lower panel 18 can thus be suppressed, there is no need to provide an additional reinforcing member, thereby contributing to weight reduction of the vehicle body 11 (FIG. 1).

As shown in FIGS. 3 and 5, the cowl reinforcing member 49 is composed of a curved part 54 located above the brake master cylinder mounting part 37 (FIG. 2) and formed to curve upward in front view, and a linear part 55 located away from the brake master cylinder mounting part 37 in the vehicle width direction and formed linearly in front view. The curved part 54 and the linear part 55 are integrated to form the cowl reinforcing member 49.

Figure 18:
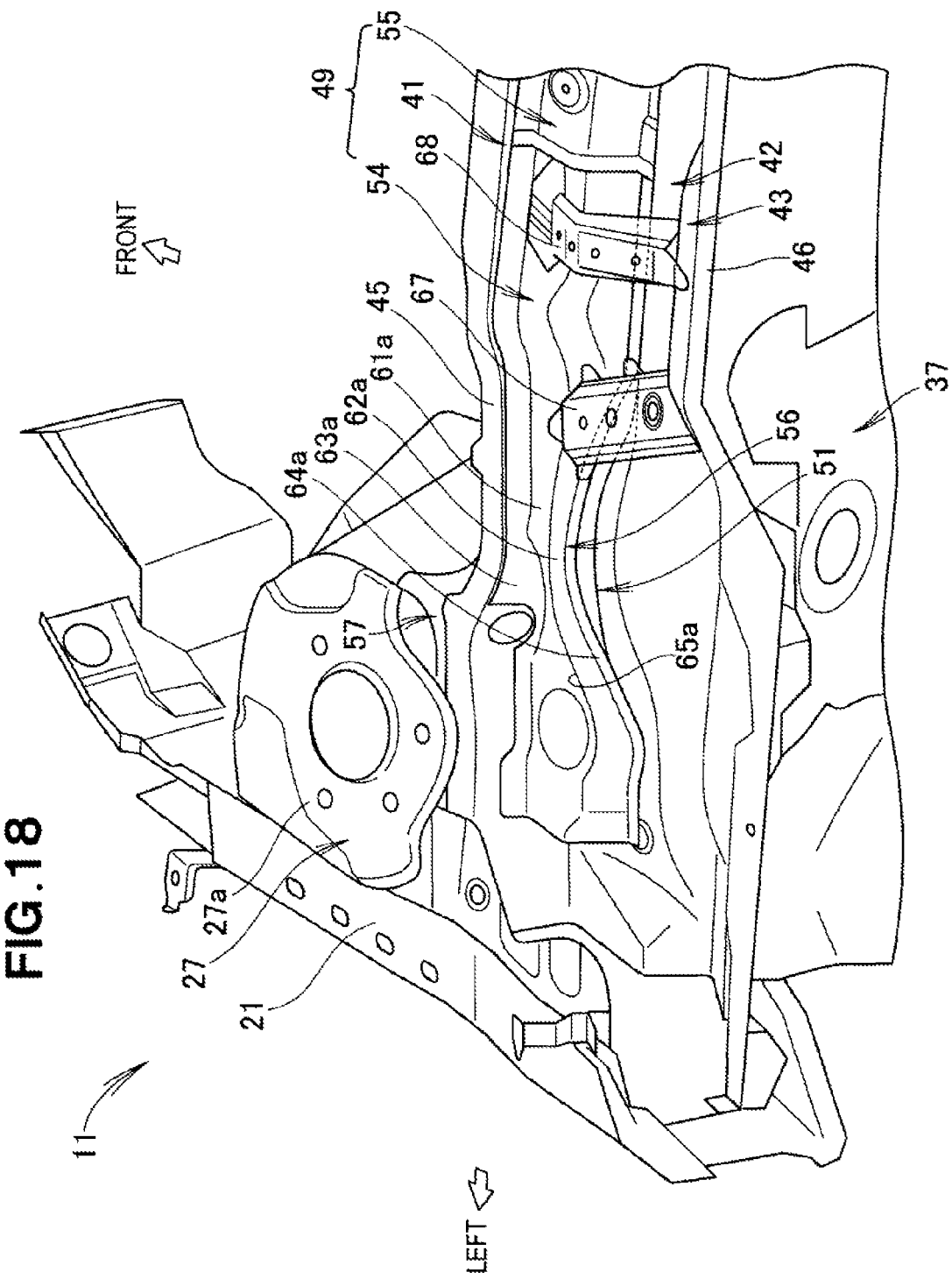
FIG. 18 is a perspective view of a left end part of the vehicle front structure of FIG. 1.
Figure 19:
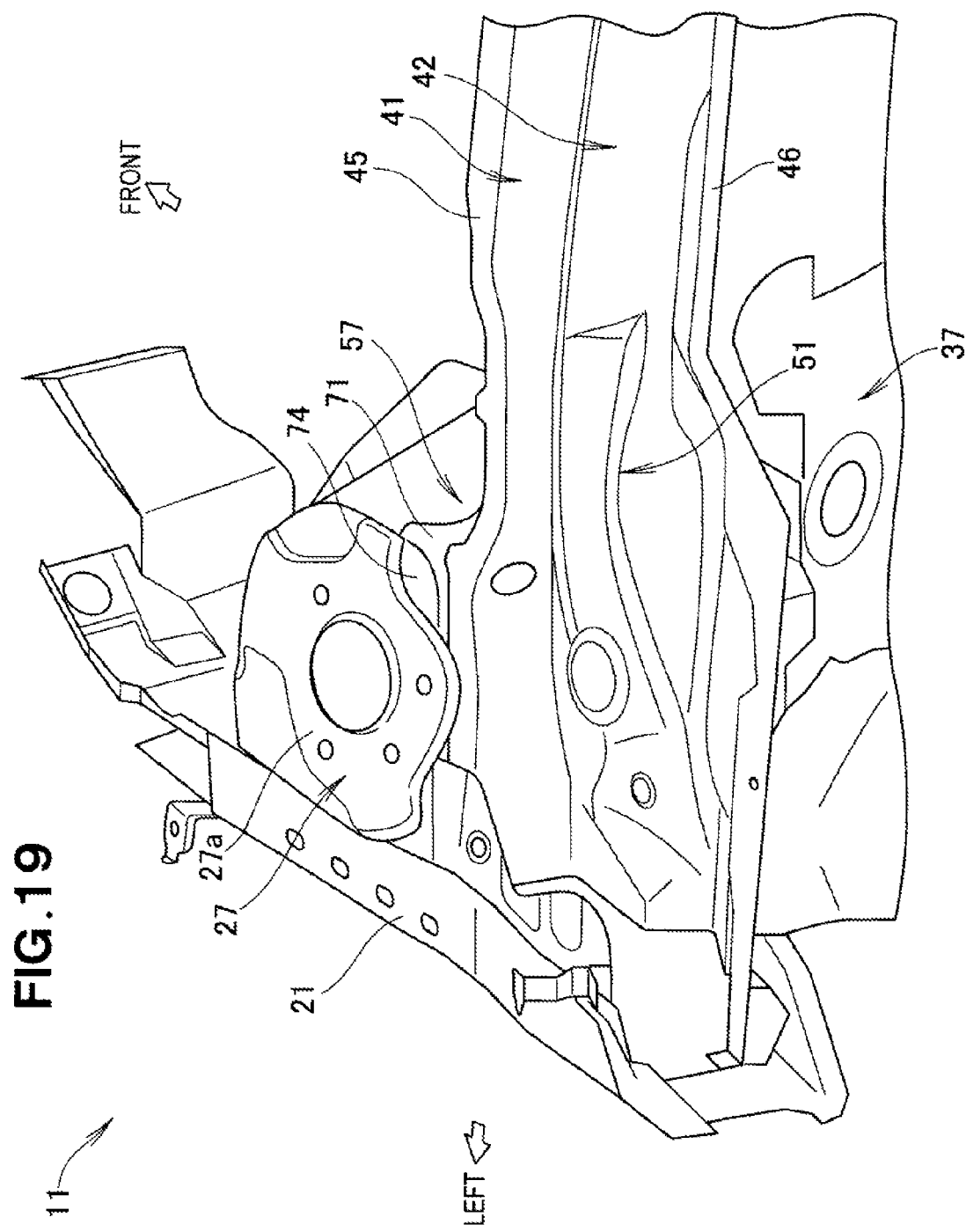
FIG. 19 is a perspective view of the same part as the one shown in FIG. 18 with a cowl reinforcing member removed.
Figure 20:
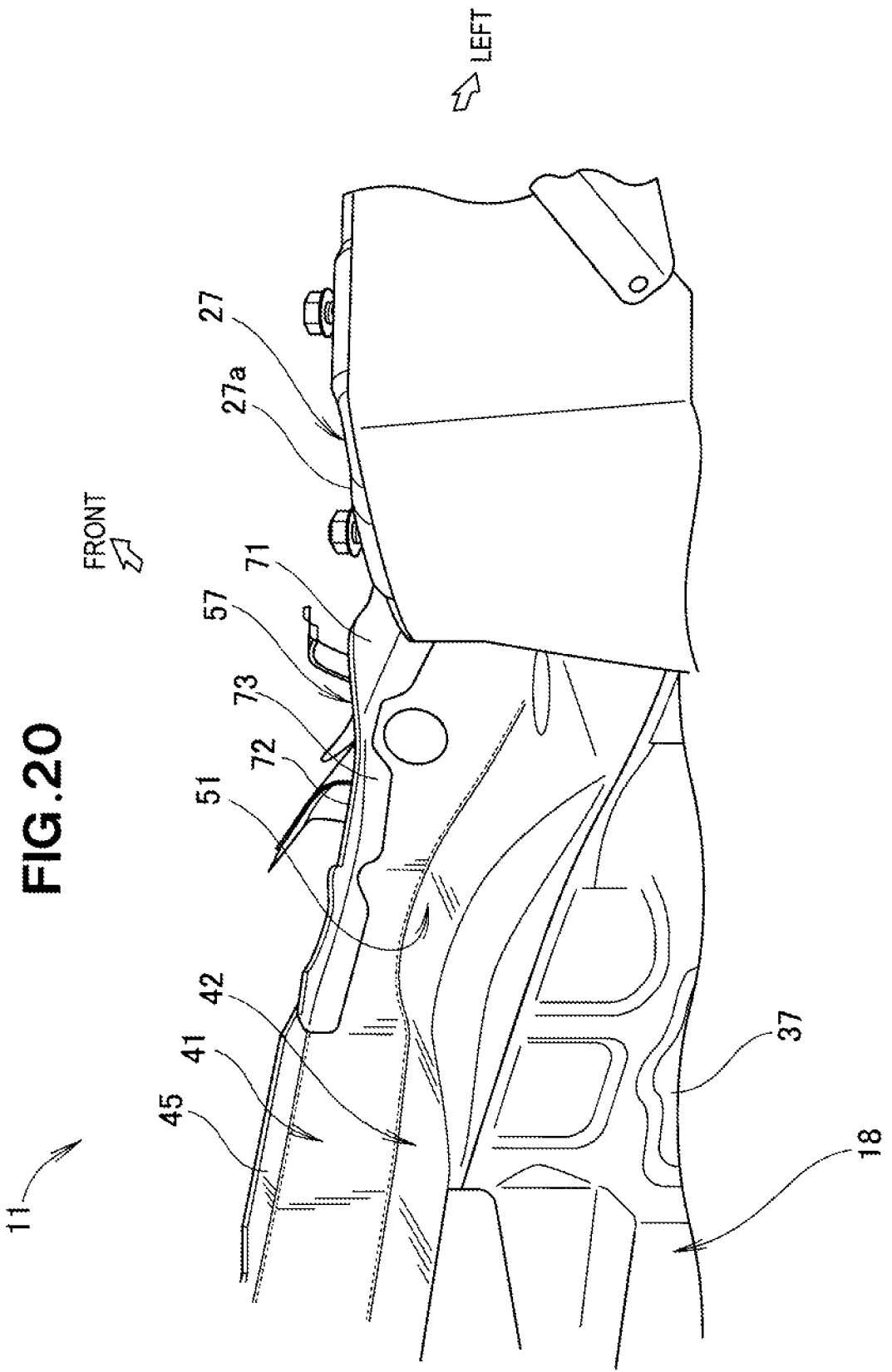
FIG. 20 is a perspective view of a left stiffener of FIG. 19 as viewed from below a vehicle front part.
Figure 21:
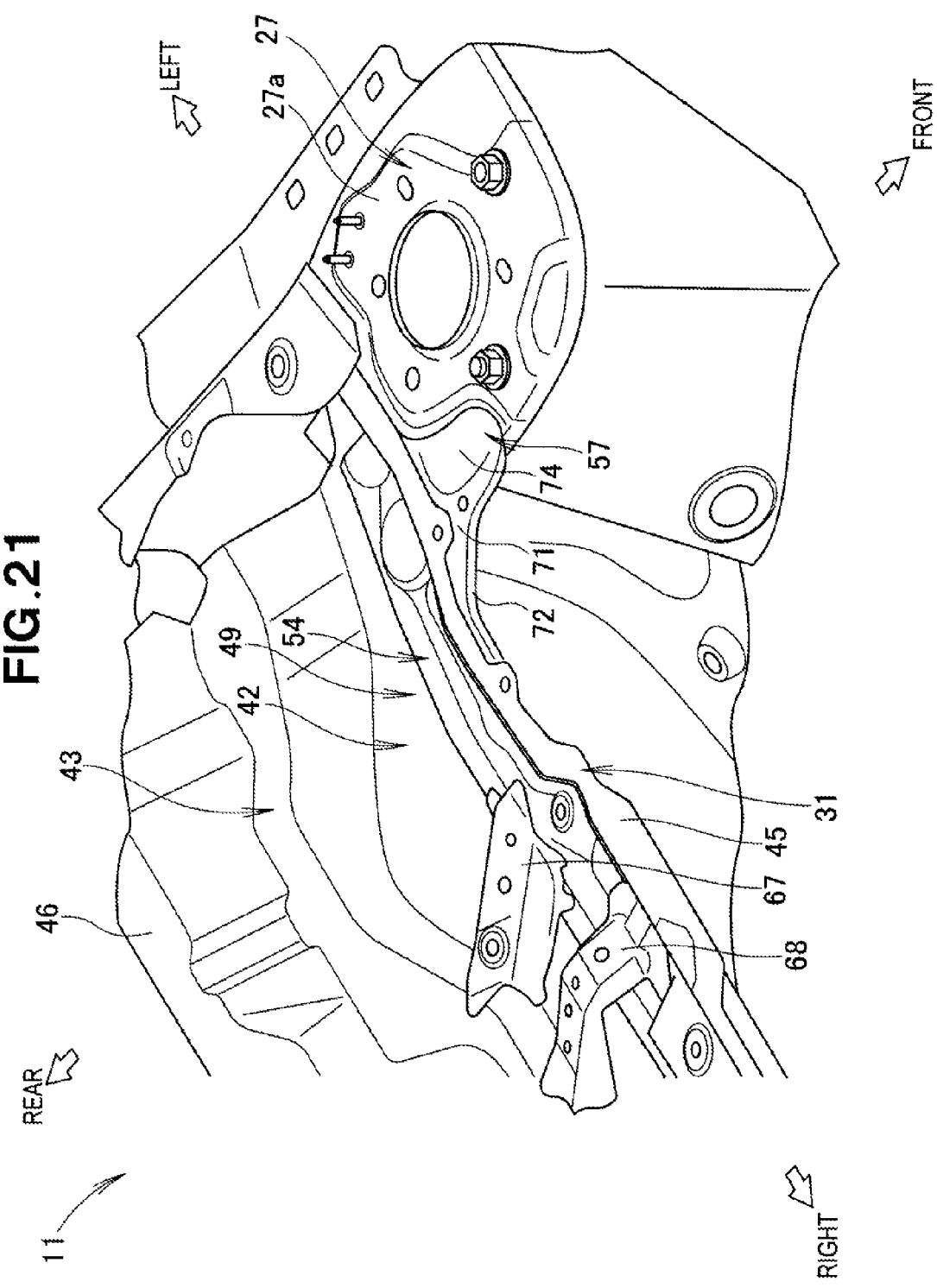
FIG. 21 is a perspective view of a left stiffener of FIG. 19 as viewed from above the vehicle front part.

The curved part 54 is formed by pressing and bending a steel plate, and extends between the front vertical wall 41 and the horizontal bottom wall 42 of the dashboard upper panel 31 to form the closed cross section 47 in a left side region of the cowl reinforcing member 49. As shown in FIG. 18, the curved part 54 has a recessed section 56 formed along the shape of the recessed section 51 of the dashboard upper panel 31.

As shown in FIGS. 5 and 6, the linear part 55 is formed of a steel plate bent into an L shape having a reinforcing upper wall 61b and a reinforcing rear wall 62b, and has a front end flange 63b extending upward from the reinforcing upper wall 61b and a rear end flange 64b extending rearward from the reinforcing rear wall 62b. Note that the linear part 55 has a ridge 65b formed between the reinforcing upper wall 61b and the reinforcing rear wall 62b. Similarly to the linear part 55, the curved part 54 has a reinforcing upper wall 61a, a reinforcing rear wall 62a, a front end flange 63a, a rear end flange 64a, and a ridge 65a. The linear part 55 is formed of a plate thinner than the curved part 54.

The linear part 55, which is formed by pressing and bending a steel plate as described above, extends continuously with the curved part 54 between the front vertical wall 41 and the horizontal bottom wall 42 of the dashboard upper panel 31 to form the closed cross section 47 in a right side region of the cowl reinforcing member 49.

As shown in FIG. 3, a cowl opening reinforcing member (longitudinal reinforcing member) 66 for reinforcing the dashboard upper panel 31 having a U-shaped cross section is attached to extend between the linear part 55 of the cowl reinforcing member 49 and the rear inclined wall 43 of the dashboard upper panel 31. Further, first and second wiper motor mounting brackets 67, 68 are attached to extend between the curved part 54 of the cowl reinforcing member 49 and the rear inclined wall 43 of the dashboard upper panel 31.

A wiper motor 69 for wiping the windshield 24 is mounted on the first and second wiper motor mounting brackets 67, 68. At a laterally central part of the dashboard upper panel 31, the linear part 55 of the cowl reinforcing member 49 and the rear inclined wall 43 of the dashboard upper panel 31 are connected by the cowl opening reinforcing member (longitudinal reinforcing member) 66, so that the dashboard upper panel 31 can have increased strength in the longitudinal direction of the vehicle body.

Further, the curved part 54 of the cowl reinforcing member 49 and the rear inclined wall 43 of the dashboard upper panel 31 are connected by the first and second wiper motor mounting brackets 67, 68, so that the dashboard upper panel 31 can have further increased strength in the longitudinal direction of the vehicle body, while reinforcing the curved part 54 of the cowl reinforcing member 49.

As shown in FIG. 5, the windshield lower support member 32 supports the lower end 24a of the windshield 24. The windshield lower support member 32 has the windshield supporting surface 81 formed to extend forward and downward, an upper surface 82 extending rearward from the windshield supporting surface 81, a rear surface 83 extending downward and rearward from the upper surface 82, and a horizontal flange 84 extending horizontally from the rear surface 83.

At a laterally central part of the vehicle body, the windshield lower support member 32 is provided with a windshield-lower-support-member reinforcing stay 86 on a side facing the dashboard upper panel 31. The windshield-lower-support-member reinforcing stay 86 has a front flange 87 formed to fit along the windshield supporting surface 81, a stay body 88 extending obliquely rearward and downward from the front flange 87, and a rear flange 89 extending rearward from the stay body 88.

The rear flange 89 of the windshield-lower-support-member reinforcing stay 86 is joined together with the horizontal flange 84 of the windshield lower support member 32 and the rear horizontal flange 46 of the dashboard upper panel 31.

In FIG. 7, as described above, the dashboard lower panel 18 has the inclined flange 93 formed at an upper end 18a thereof, and the side edge flanges 94, 94 joined to front-pillar inner panels 19a, 19a of the front pillars 19, 19 (FIG. 4). The inclined flange 93 is formed continuously with the side edge flanges 94, 94 so as to form the L-shaped waterproof wall 95 at each of the corner parts 18c, 18c of the dashboard lower panel 18. With this configuration, intrusion of water from the dashboard upper panel 31 can be prevented, thereby improving waterproof property of the vehicle front structure with high reliability.

Figure 8:
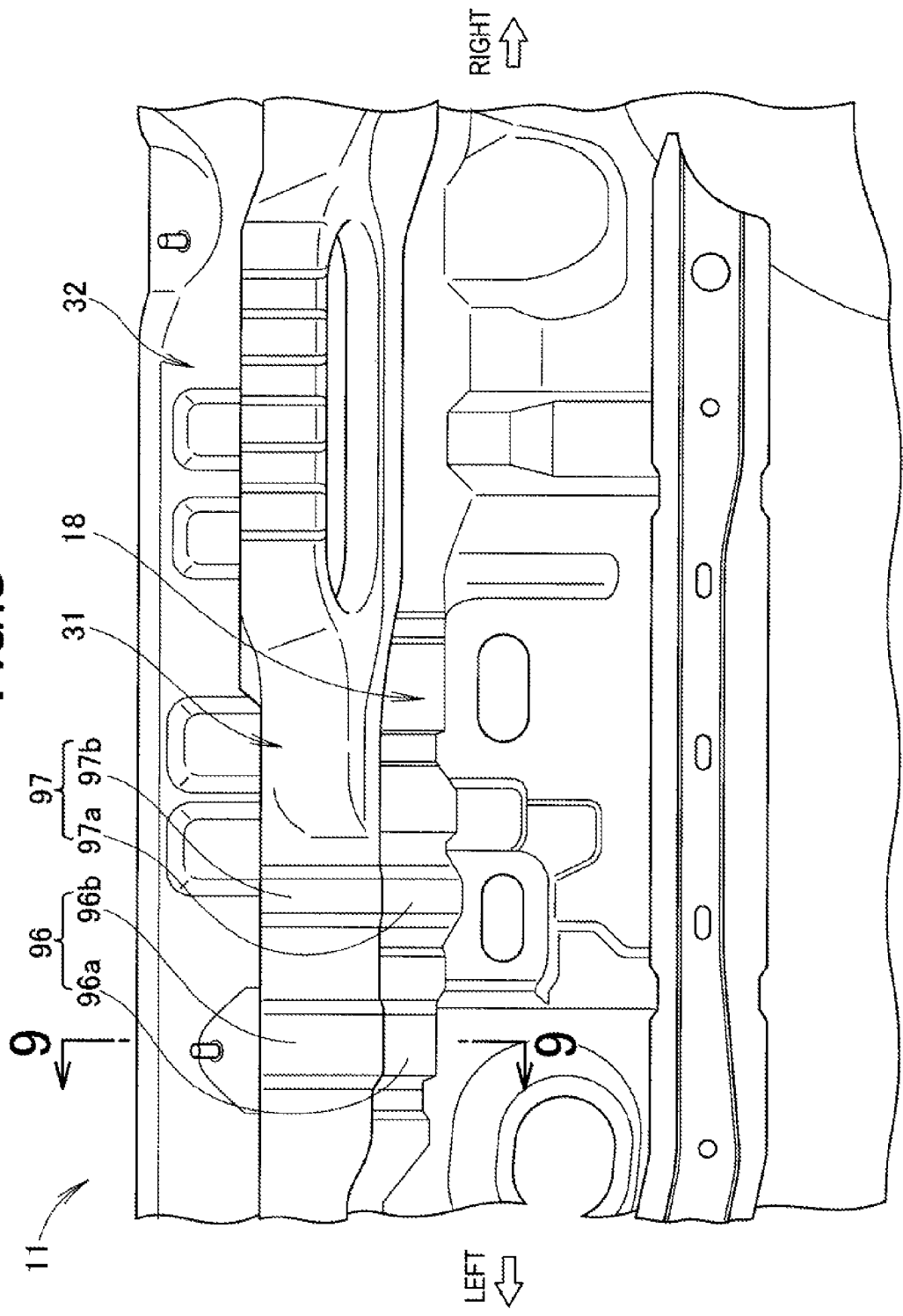
FIG. 8 is an enlarged plan view of part of the vehicle front structure of FIG.
Figure 9:
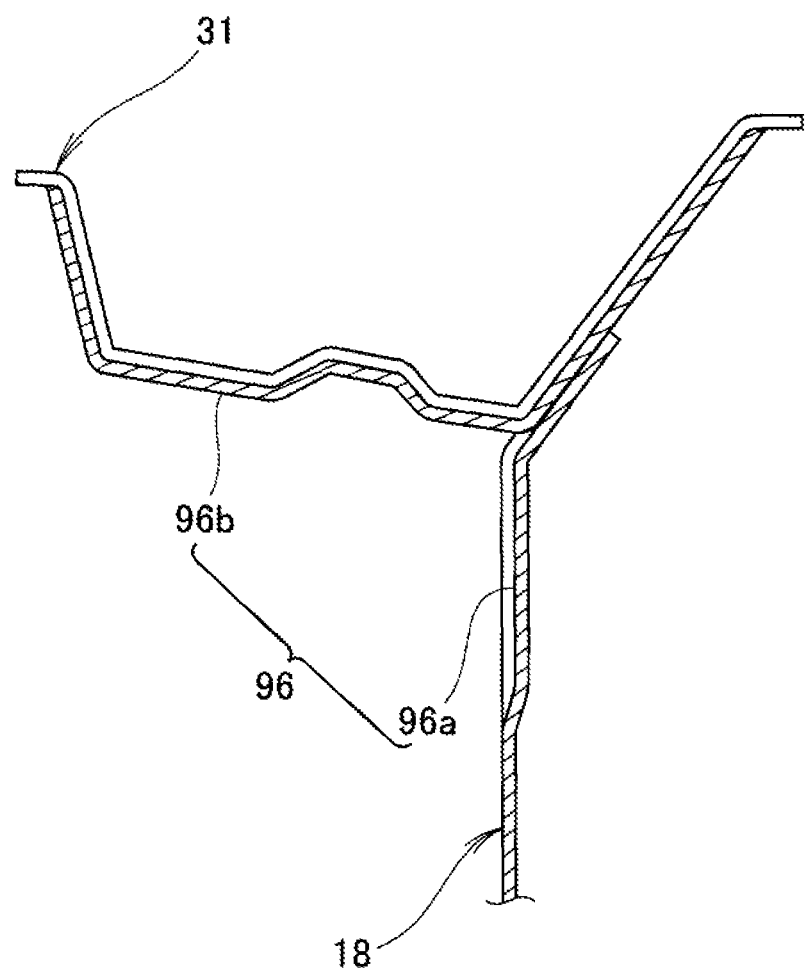
FIG. 9 is an enlarged cross-sectional view taken along line 9-9 of FIG. 8.

As shown in FIGS. 4, 8, and 9, the dashboard lower panel 18 has first and second beads 96, 97 formed thereon to extend continuously onto the dashboard upper panel 31. More specifically, the first bead 96 is composed of a first lower bead part 96a formed on the dashboard lower panel 18, and a first upper bead part 96b formed on the dashboard upper panel 31. Similarly, the second bead 97 is composed of a second lower bead part 97a formed on the dashboard lower panel 18 and a second upper bead part 97b formed on the dashboard upper panel 31.

Since it is required to ensure a space forward of the dashboard lower panel 18 corresponding to a rearward displacement amount of components mounted within the engine room 13 upon head-on collision, and a space rearward of the engine room 13 for the air conditioner (air conditioning apparatus), for example, it is difficult to ensure a space for providing a reinforcing member to suppress vibration of the dashboard lower panel 18. Therefore, the first and second beads 96, 97 are formed on the dashboard lower panel 18 and continuously on the dashboard upper panel 31 to thereby ensure a space for the air conditioner, while suppressing vibration of the dashboard lower panel 18.

Next will be described an improvement of mounting property of the cowl box 23 of the vehicle front structure according to the present invention with reference to FIGS. 10(a), 10(b), and 11(a), 11(b).

As shown in FIGS. 10(a), 10(b), and 11(a), 11(b), when the dashboard upper panel 31 is mounted on the dashboard lower panel 18 and the left and right damper housings 27, 27 from above, the rear inclined wall 43 abuts on the inclined flange 93, and the front vertical wall 41 and the front horizontal flange 45 abut respectively on rear walls 27b, 27b and upper walls 27a, 27a of the damper housings 27.

Figure 10B:
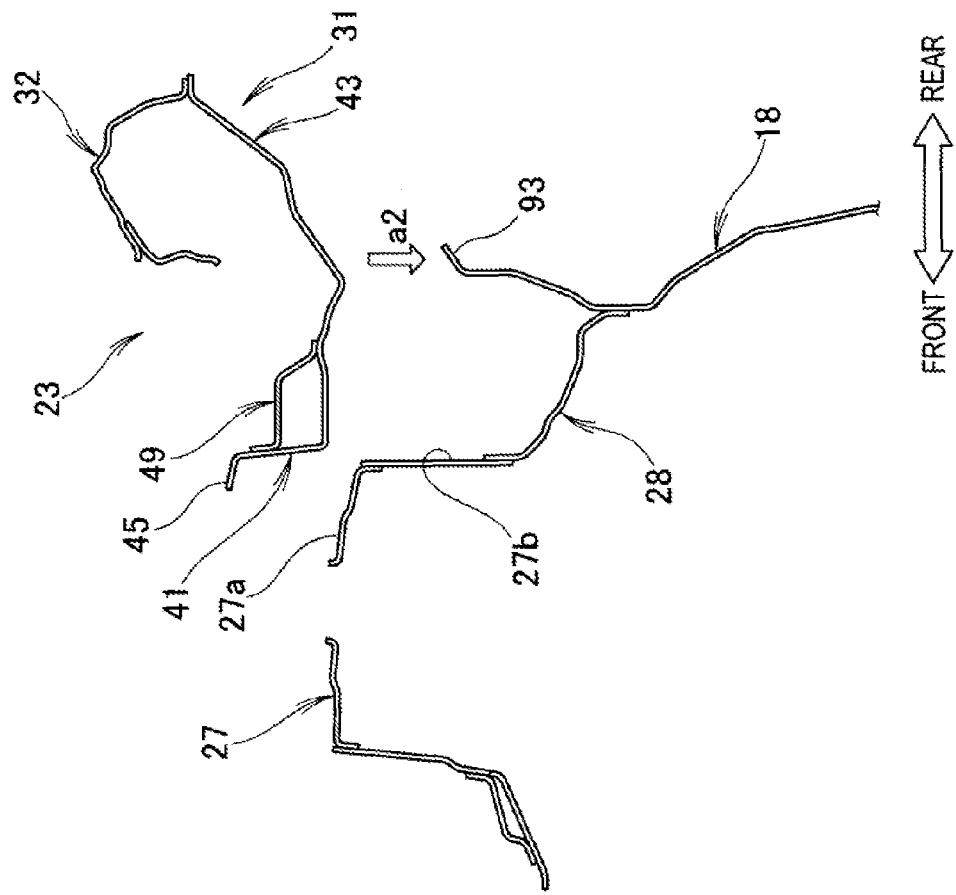
FIGS. 10(a) and 10(b) are views showing how a dashboard lower panel, a dashboard upper panel, and a damper housing of FIG. 6 are assembled together.
Figure 10A:
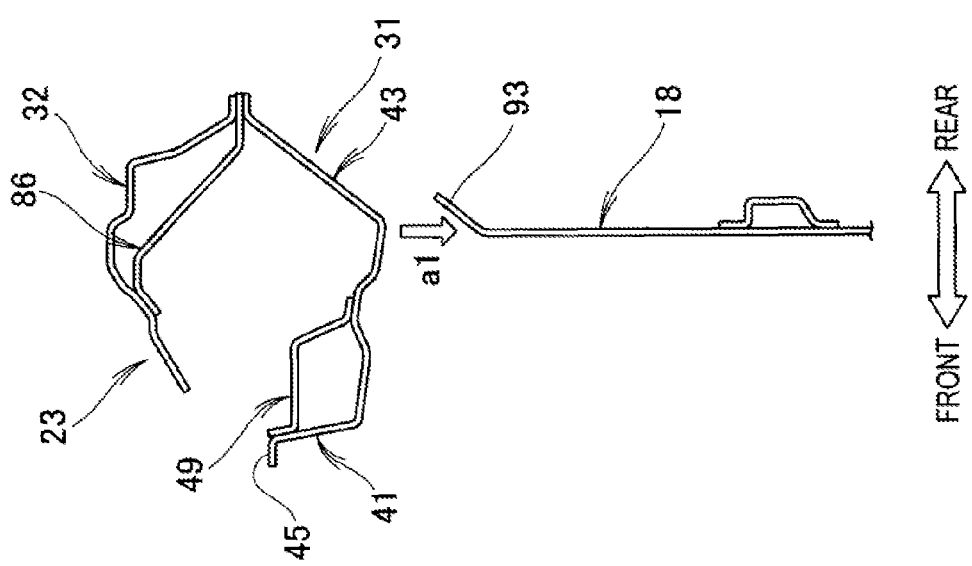

More specifically, as shown in FIGS. 10(a), 10(b), the cowl box 23, which is composed of the dashboard upper panel 31, the windshield lower support member 32, the cowl top 33 (FIG. 5), the cowl reinforcing member 49, and the windshield-lower-support-member reinforcing stay 86, is placed from above the dashboard lower panel 18 and the damper housings 27, 27 as indicated by arrows a1 and a2.

In FIGS. 11(a), 11(b), the cowl box 23 is lowered as indicated by arrows a3 and a4. At the laterally central part of the cowl box 23, as shown in FIG. 11(a), the inclined flange 93 abuts on the rear inclined wall 43, whereby rearward movement of the cowl box 23 is restricted, and a force is applied to press forward the cowl box 23 as indicated by arrow a5. In other words, an urging force caused by gravity acts in a forward direction.

At the lateral end part of the cowl box 23, as shown in FIG. 11(b), the front vertical wall 41 and the front horizontal flange 45 abut respectively on the rear wall 27b and the upper wall 27a of the damper housing 27, whereby forward movement of the cowl box 23 is restricted as indicated by arrow a6, and the cowl box 23 is positioned.

As described above, the dashboard upper panel 31 has the rear inclined wall 43 extending obliquely upward and rearward to constitute a rear section of the dashboard upper panel 31, and has the horizontal bottom wall 42, the front vertical wall 41, and the front horizontal flange 45 formed continuously to constitute a front section of the dashboard upper panel 31. The rear inclined wall 43 abuts on the inclined flange 93 formed at the upper end 18a of the dashboard lower panel 18, and the front vertical wall 41 and the front horizontal flange 45 abut respectively on the rear walls 27b, 27b and the upper walls 27a, 27a of the damper housings 27. When the dashboard upper panel 31 is placed on the dashboard lower panel 18 and the damper housings 27, 27 from above, with the inclined flange 93 abutting on the rear inclined wall 43, rearward movement of the dashboard upper panel 31 is restricted, and an urging force caused by gravity acts in the forward direction. Further, with the front vertical wall 41 and the front horizontal flange 45 abutting respectively on the rear walls 27b, 27b and the upper walls 27a, 27a of the damper housings 27, forward movement of the dashboard upper panel 31 is restricted, whereby the dashboard upper panel 31 is positioned. As a result, mounting property of the dashboard upper panel 31 can be improved.

Figure 12:
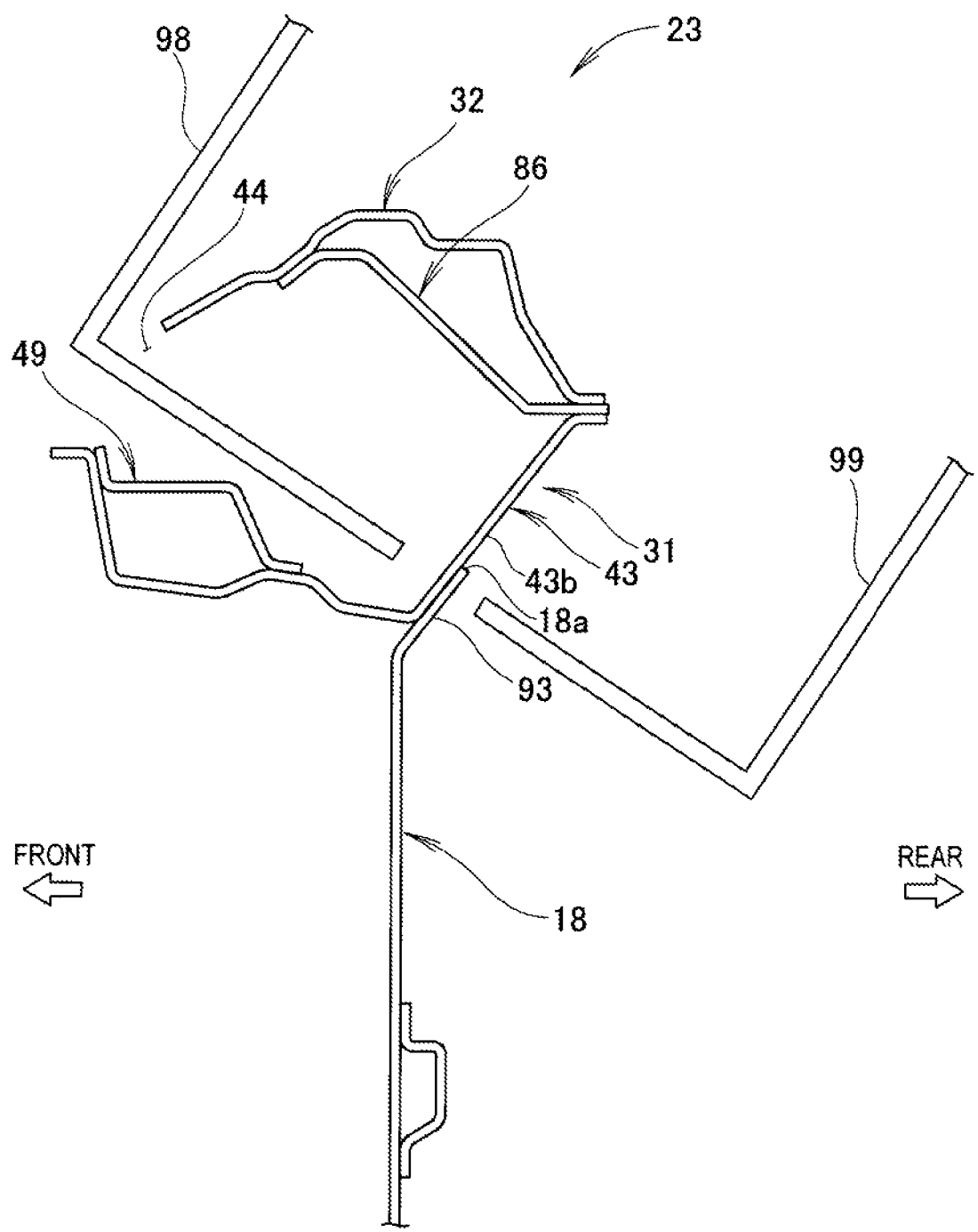
FIG. 12 is a view showing how the dashboard lower panel and the dashboard upper panel of FIG. 5 are welded together.
Figure 13:
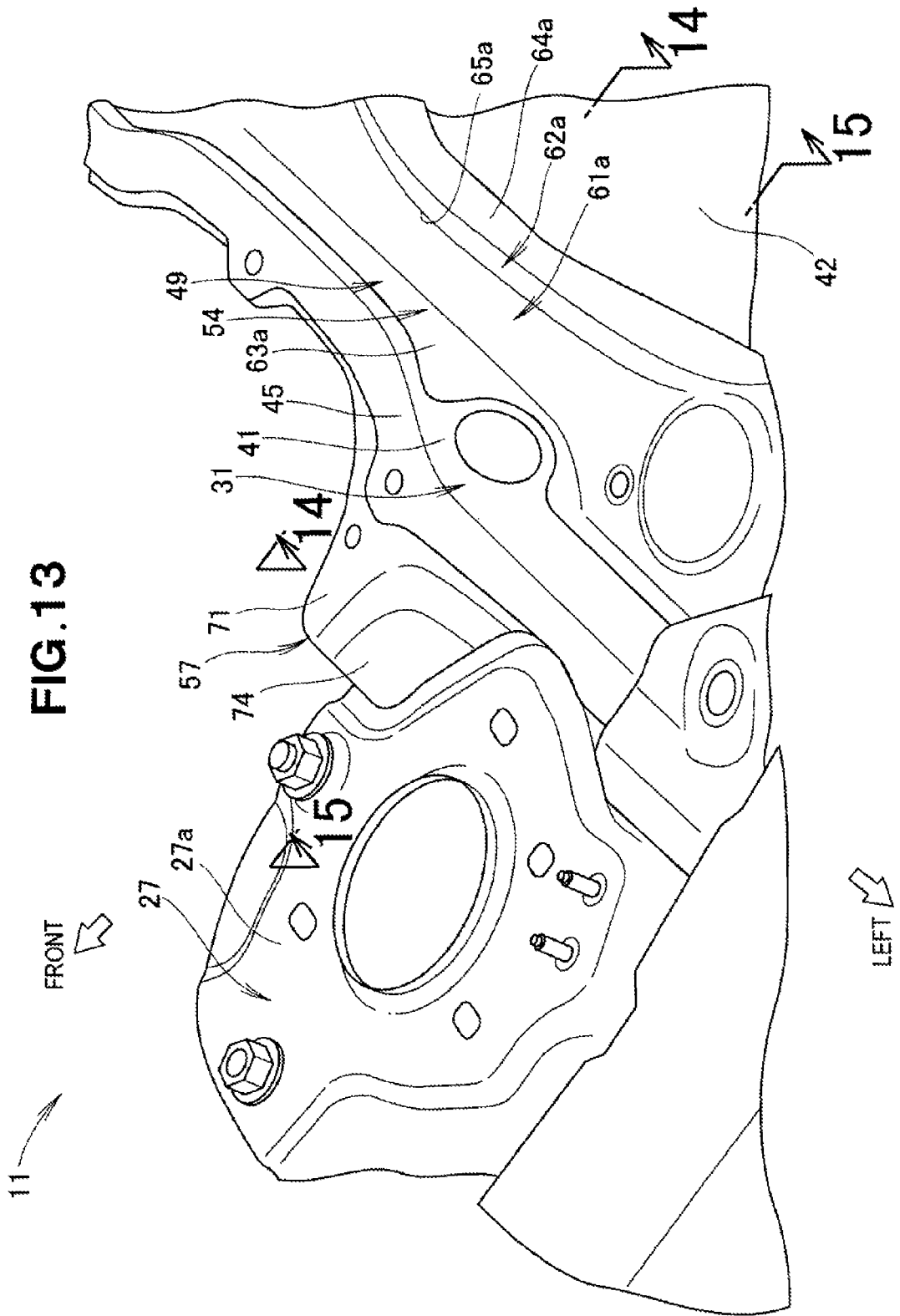
FIG. 13 is an enlarged perspective view of part of the vehicle front structure of FIG. 1.

Next will be described an improvement of welding workability of the cowl box 23 of the vehicle front structure according to the present invention with reference to FIG. 12. The windshield lower support member 32 and the dashboard upper panel 31 are formed in a shape such that a first welding gun 98 is allowed to be inserted from the cowl opening 44, while a second welding gun 99 is brought close to the first welding gun 98 from behind the rear inclined wall 43, i.e. close to a back surface 43b of the rear inclined wall 43, to weld together the rear inclined wall 43 and the inclined flange 93 from both sides.

That is, the rear inclined wall 43 of the dashboard upper panel 31 is abutted on the inclined flange 93 formed at the upper end 18a of the dashboard lower panel 18, then the first welding gun 98 is inserted from the cowl opening 44 formed by the windshield lower support member 32 and the dashboard upper panel 31, and the second welding gun 99 is brought close to the first welding gun 98 from the back surface 43b side of the rear inclined wall 43. The rear inclined wall 43 and the inclined flange 93 can be welded together in this manner by such a mass-producible welding method. Thus, welding workability can be improved.

As shown in FIGS. 1 to 6, the vehicle front structure includes the dashboard lower panel 18 having the opposite ends 18b, 18b in the vehicle width direction joined to the left and right front pillars 19, 19, the dashboard upper panel 31 mounted on the upper part of the dashboard lower panel 18, and the left and right damper housings 27, 27 provided forward of the dashboard lower panel 18.

The dashboard upper panel 31 has the front vertical wall 41 extending substantially vertically in the height direction of the vehicle body, the horizontal bottom wall 42 extending from the lower end 41b of the front vertical wall 41 substantially horizontally in the longitudinal direction of the vehicle body, and the rear inclined wall 43 extending obliquely upward and rearward from the rear end 42a of the horizontal bottom wall 42. The dashboard lower panel 18 has the vertical wall 91, and the inclined flange 93 formed at the upper end 18a of the vertical wall 91 (dashboard lower panel 18).

During traveling, the dumper housings 27 fall inward, and vibration is generated due to the inward falling of the damper housings 27. The vibration is transmitted to the dashboard upper panel 31 that is joined to the damper housings 27, and then transmitted from the dashboard upper panel 31 to the dashboard lower panel 18, thereby causing vibration inside the cabin 12.

In the vehicle front structure, by joining the inclined flange 93 of the dashboard lower panel 18 to the lower part 43a of the rear inclined wall 43 of the dashboard upper panel 31, the dashboard upper panel 31 is supported at substantially the center thereof in the longitudinal direction of the vehicle body from below by the vertical wall 91 of the dashboard lower panel 18. Thus, supporting stability of the dashboard upper panel 31 can be increased, whereby vibration of the dashboard upper panel 31 can be suppressed. By thus reducing vibration transmitted from the dashboard upper panel 31 to the dashboard lower panel 18, vibration inside the cabin 12 can be reduced. As a result, it is possible to improve quietness inside the cabin 12.

In the vehicle front structure, the dashboard lower panel has the side edge flanges 94, 94 joined to the front-pillar inner panels 19a, 19a of the front pillars 19, 19, each of which is formed continuously with the inclined flange 93 so as to form the L-shaped waterproof wall 95 at each of the corner parts 18c, 18c (FIG. 7) of the dashboard lower panel 18. With this configuration, intrusion of water into the cabin 12 from the dashboard upper panel 31 can be surely prevented.

In the vehicle front structure, the dashboard upper panel 31 is configured so that, when being mounted on the dashboard lower panel 18 and the damper housings 27, 27 from above, the rear inclined wall 43 abuts on the inclined flange 93, and the front vertical wall 41 and the front horizontal flange 45 extending forward from the upper end 41a of the front vertical wall 41 abut respectively on the rear walls 27b, 27b and the upper walls 27a, 27a of the damper housings 27, 27.

In other words, when the dashboard upper panel 31 is placed on the dashboard lower panel 18 and the damper housings 27, 27 from above, with the inclined flange 93 abutting on the rear inclined wall 43, rearward movement of the dashboard upper panel 31 is restricted, and an urging force caused by gravity acts in the forward direction. Further, with the front vertical wall 41 and the front horizontal flange 45 abutting respectively on the rear walls 27b, 27b and the upper walls 27a, 27a of the damper housings 27, 27, forward movement of the dashboard upper panel 31 is restricted, whereby the dashboard upper panel 31 is positioned. As a result, mounting property of the dashboard upper panel 31 can be improved.

In the vehicle front structure, the dashboard upper panel 31 is provided with the windshield lower support member 32 for supporting the windshield 24. The dashboard upper panel 31 and the windshield lower support member 32 together form the cowl opening 44 opened forward and upward.

The dashboard upper panel 31 and the windshield lower support member 32 are formed in such a shape that the first welding gun 98 is allowed to be inserted from the cowl opening 44, while the second welding gun 99 is brought close to the first welding gun 98 from behind the rear inclined wall 43, to thereby weld together the rear inclined wall 43 and the inclined flange 93 from both sides. With this configuration, the dashboard upper panel 31 and the windshield lower support member 32 can be welded together by such a mass-producible welding method, and thus welding workability of the vehicle front part can also be improved.

In the vehicle front structure, the wheel houses 28, 28 for covering the wheels 29, 29 are mounted below the damper housings 27, 27, and each of the lateral opposite ends 31b, 31b of the dashboard upper panel 31 forms the closed cross section 34 together with the dashboard lower panel 18, the corresponding one of the damper housings 27, 27, and the corresponding one of the wheel houses 28, 28, whereby the vehicle front part can have increased rigidity.

In the vehicle front structure, the dashboard lower panel 18 has the first and second beads 96, 97 formed thereon to extend continuously onto the dashboard upper panel 31. Since it is required to ensure a space forward of the dashboard lower panel 18 corresponding to a rearward displacement amount of the components mounted within the engine room 13 upon head-on collision, and a space rearward of the engine room 13 for cabin-side components of the air conditioner (air conditioning apparatus), for example, it is difficult to ensure a space for providing a reinforcing member to suppress vibration of the dashboard lower panel 18. Therefore, the first and second beads 96, 97 are formed on the dashboard lower panel 18 and continuously on the dashboard upper panel 31 to thereby ensure a space for the cabin-side components of the air conditioner, while suppressing vibration of the dashboard lower panel 18.

Figure 14:
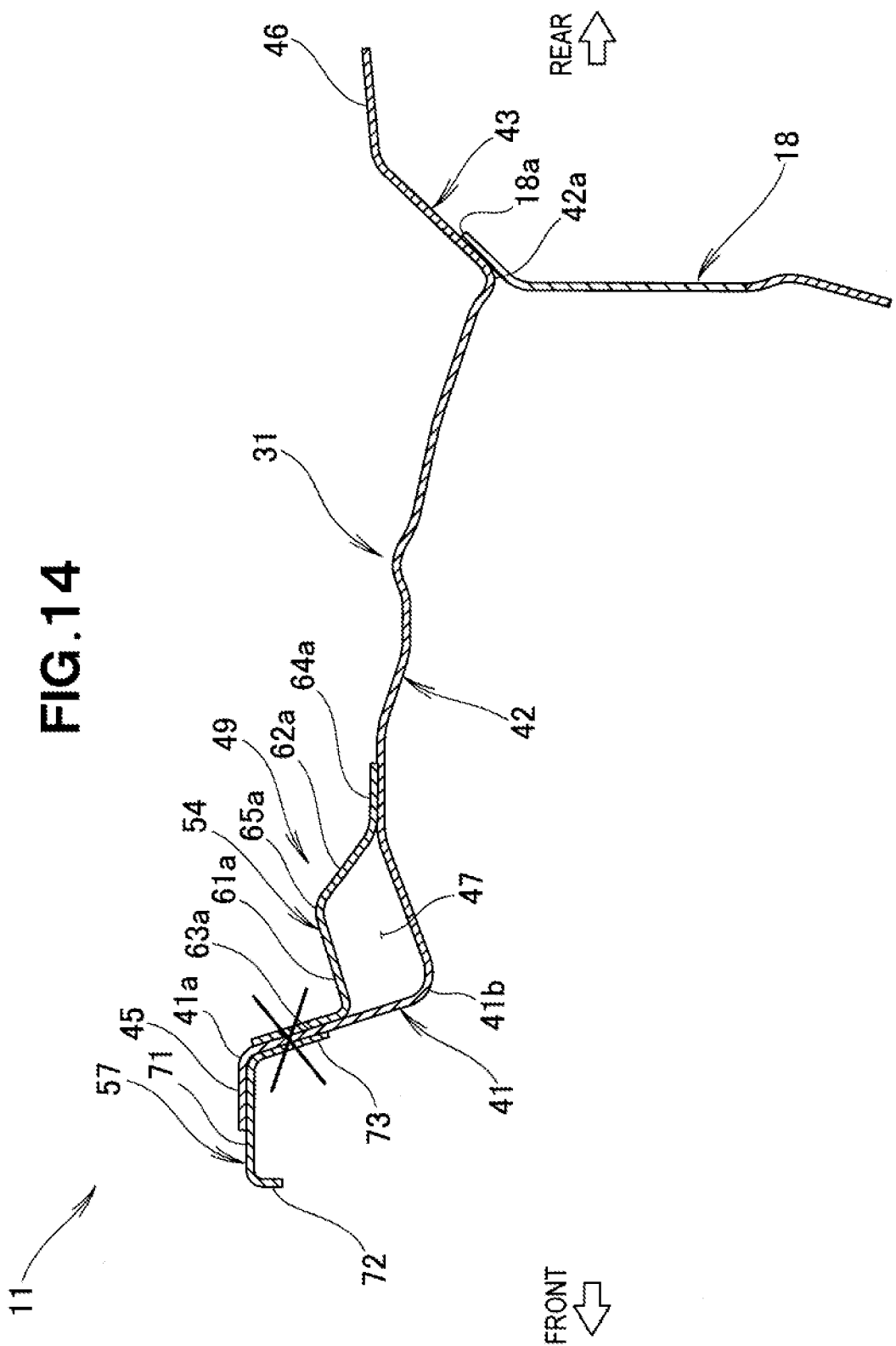
FIG. 14 is an enlarged cross-sectional view taken along line 14-14 of FIG. 13.
Figure 15:
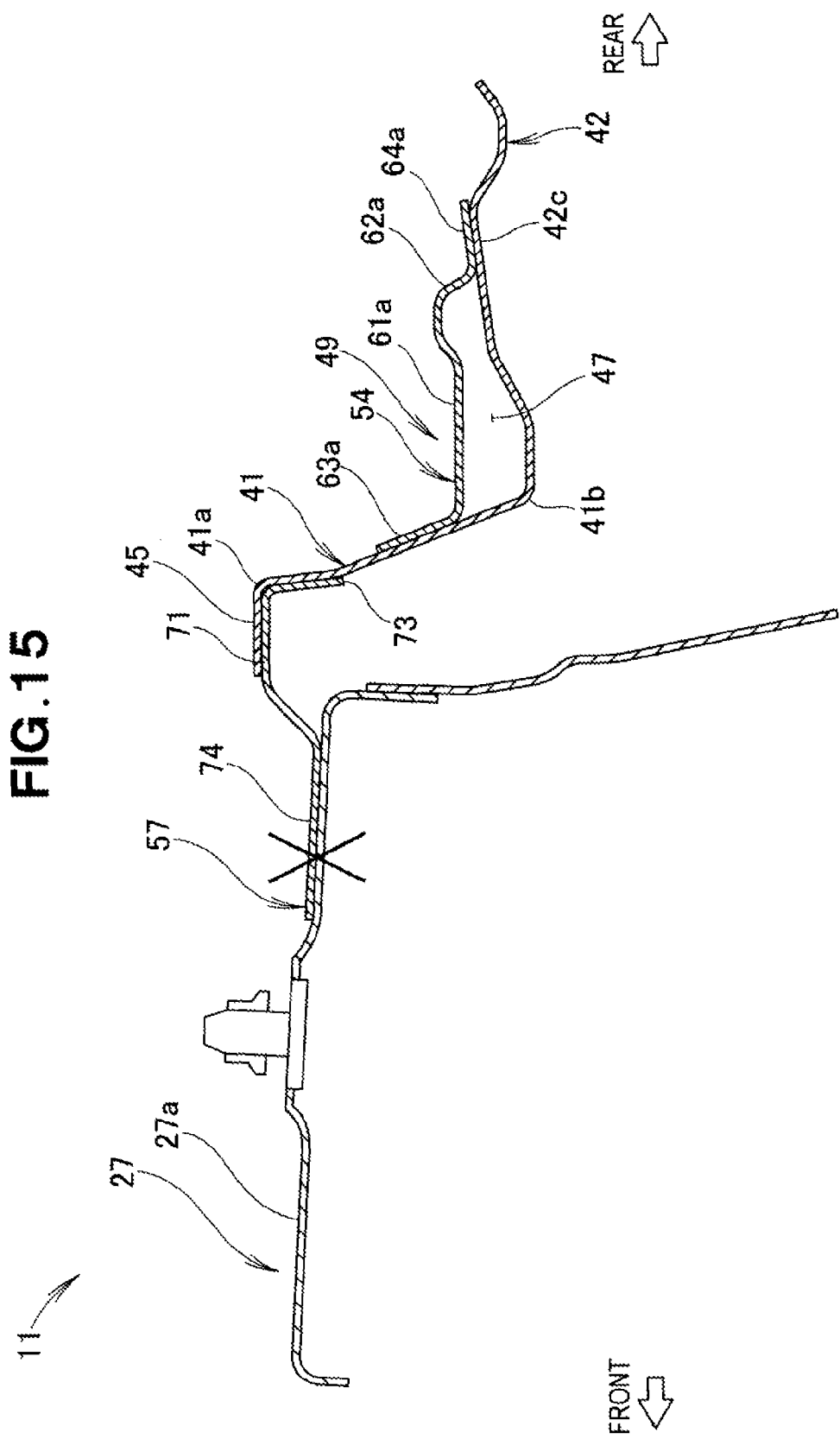
FIG. 15 is an enlarged cross-sectional view taken along line 15-15 of FIG. 13.

As shown in FIGS. 14 and 15, the curved part 54 of the cowl reinforcing member 49 is formed of a steel plate bent into the L shape having the reinforcing upper wall 61*a* and the reinforcing rear wall 62*a*. The front end flange 63*a* of the curved part 54 extends upward from the reinforcing upper wall 61*a* to be joined to the front vertical wall 41. The rear end flange 64*a* of the curved part 54 extends rearward from the reinforcing rear wall 62*a* to be joined to a raised part. 42*c* of the horizontal bottom wall 42. The ridge 65*a* is formed between the reinforcing upper wall 61*a* and the reinforcing rear wall 62*a*.

Figure 16:
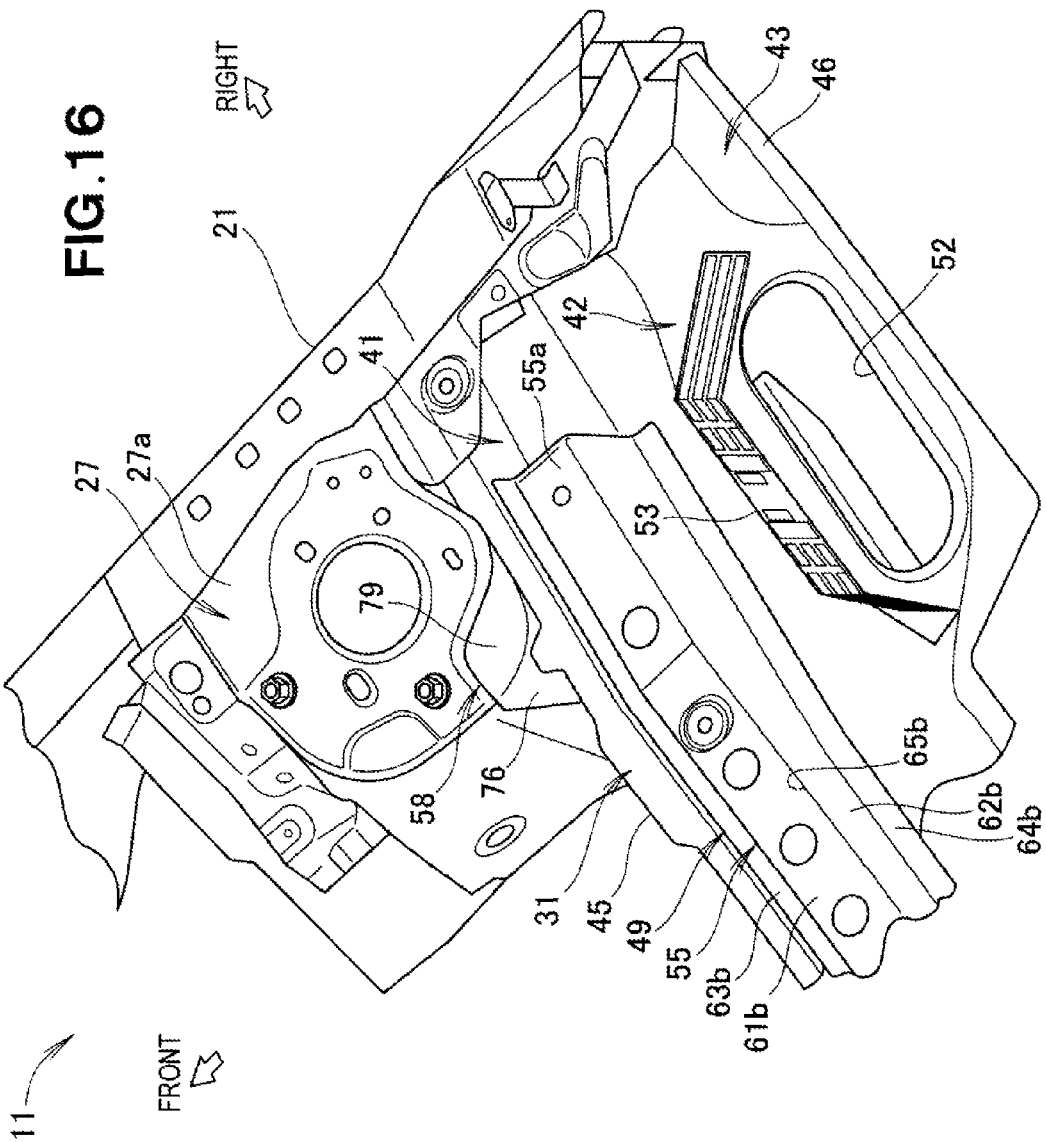
FIG. 16 is a perspective view of a right end part of the vehicle front structure of FIG. 1.
Figure 17:
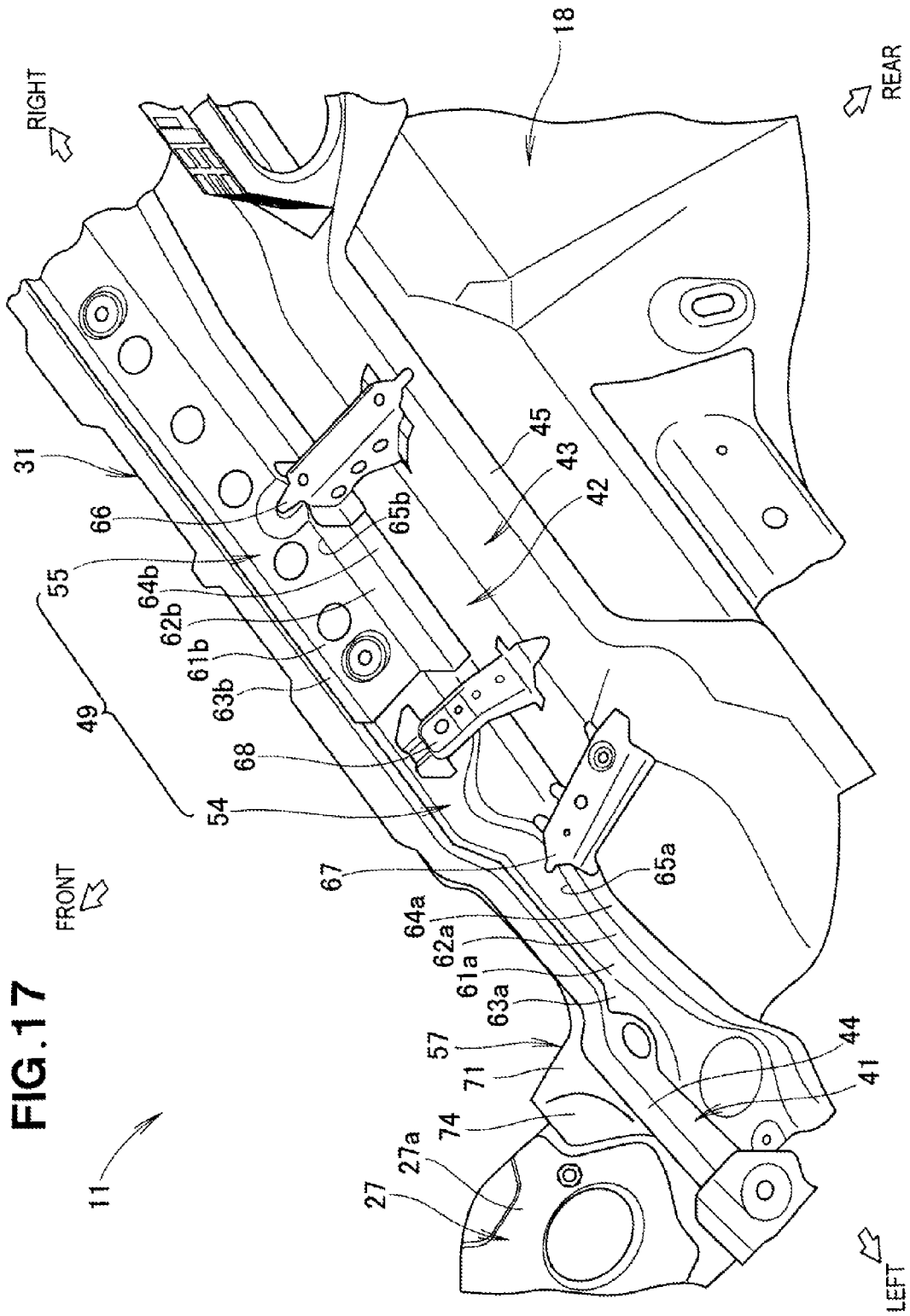
FIG. 17 is a perspective view of a laterally central part of the vehicle front structure of FIG. 1.

As shown in FIGS. 16 to 18, the linear part 55 of the cowl reinforcing member 49 is formed of a steel plate bent into the L shape having the reinforcing upper wall 61*b* and the reinforcing rear wall 62*b*. The front end flange 63*b* of the linear part 55 extends upward from the reinforcing upper wall 61*b* to be joined to the front vertical wall 41. The rear end flange 64*b* of the linear part 55 extends rearward from the reinforcing rear wall 62*b* to be joined to the raised part 42*c* (FIG. 15) of the horizontal bottom wall 42. The linear part 55 can have increased strength and rigidity by being joined in this manner to the raised part 42*c*. The ridge 65*b* is formed between the reinforcing upper wall 61*b* and the reinforcing rear wall 62*b*.

Since the linear part 55 of the cowl reinforcing member 49 does not have the recessed section 56, the linear part 55 can be formed of a thinner plate, which contributes to weight reduction of the vehicle body. Namely, the linear part 55 is formed of a plate thinner than the curved part 54. The linear part 55, which is formed by pressing and bending a steel plate as described above, extends continuously with the curved part 54 between the front vertical wall 41 and the horizontal bottom wall 42 of the dashboard upper panel 31 to form the closed cross section 47 (FIG. 15) in the right side region of the cowl reinforcing member 49.

On the other hand, the curved part 54 of the cowl reinforcing member 49 has the recessed section 56 formed at a position corresponding to the recessed section 51 of the dashboard upper panel 31, and thus the linear part 54 is formed of a thicker plate to have strength and rigidity equal to the linear part 55.

That is, the cowl reinforcing member 49 is formed of a steel plate bent into the L shape having the reinforcing upper walls 61*a*, 61*b* and the reinforcing rear walls 62*a*, 62*b*. The front end flanges 63*a*, 63*b* extend from the reinforcing upper walls 61*a*, 61*h* to be joined to the front vertical wall 41, and the rear end flanges 64*a*, 64*b* extend from the reinforcing rear wall 62*a*, 62*b* to be joined to the horizontal bottom wall 42, thereby forming the closed cross section 47.

As shown in FIGS. 3, 14, and 15, the cowl reinforcing member 49 has opposite ends 54*a*, 55*a* in the vehicle width direction joined respectively to the upper walls 27*a*, 27*a* of the damper housings 27, 27 via left and right stiffeners 57, 58, which are additionally provided to increase the rigidity of the vehicle body.

As shown in FIGS. 3, 17, 18, the cowl opening reinforcing member (longitudinal reinforcing member) 66 for reinforcing the dashboard upper panel 31 having the U-shaped cross section is attached to extend between the linear part 55 of the cowl reinforcing member 49 and the rear inclined wall 43 of the dashboard upper panel 31. Further, the first and second wiper motor mounting brackets 67, 68 are attached to extend between the curved part 54 of the cowl reinforcing member 49 and the rear inclined wall 43 of the dashboard upper panel 31.

The wiper motor 69 (FIG. 3) constituting a wiper device (not shown) for wiping the windshield 24 (FIG. 1) is mounted on the first and second wiper motor mounting brackets 67, 68. At the laterally central part of the dashboard upper panel 31, the linear part 55 of the cowl reinforcing member 49 and the rear inclined wall 43 of the dashboard upper panel 31 are connected by the cowl opening reinforcing member (longitudinal reinforcing member) 66, so that the dashboard upper panel 31 can have increased strength in the longitudinal direction of the vehicle body.

Further, the curved part 54 of the cowl reinforcing member 49 and the rear inclined wall 43 of the dashboard upper panel 31 are connected by the first and second wiper motor mounting brackets 67, 68, so that the dashboard upper panel 31 can have further increased strength in the longitudinal direction of the vehicle body, while reinforcing the curved part 54 of the cowl reinforcing member 49. With this arrangement, it is also possible to make the curved part 54 thinner.

As shown in FIGS. 14, 15, and 19 to 23, the left stiffener 57 has a stiffener body 71 extending substantially horizontally, a front flange 72 formed forward of the stiffener body 71, a rear flange 73 rearward of the stiffener body 71, and a housing junction part 74 formed laterally outward of the stiffener body 71.

Herein, a description will be given of a joint structure of the stiffener 57 on the left side (one lateral side) of the vehicle body. In the vicinity of the recessed section 51 of the dashboard upper panel 31, the rear flange 73 of the left stiffener 57 and the front end flange 63*a* of the curved part 54 of the cowl reinforcing member 49 are welded together with the front vertical wall 41 of the dashboard upper panel 31 sandwiched therebetween.

As shown in FIG. 15, the housing junction part 74 of the left stiffener 57 is joined to the upper wall 27*a* of the damper housing 27. By thus providing the left stiffener 57, a combined part having the closed cross section 47 formed by the curved part 54 of the cowl reinforcing member 49 and the dashboard upper panel 31 is joined with the upper wall 27*a* of the damper housing 27, which imparts increased structural rigidity to the dashboard upper panel 31.

Figure 22:
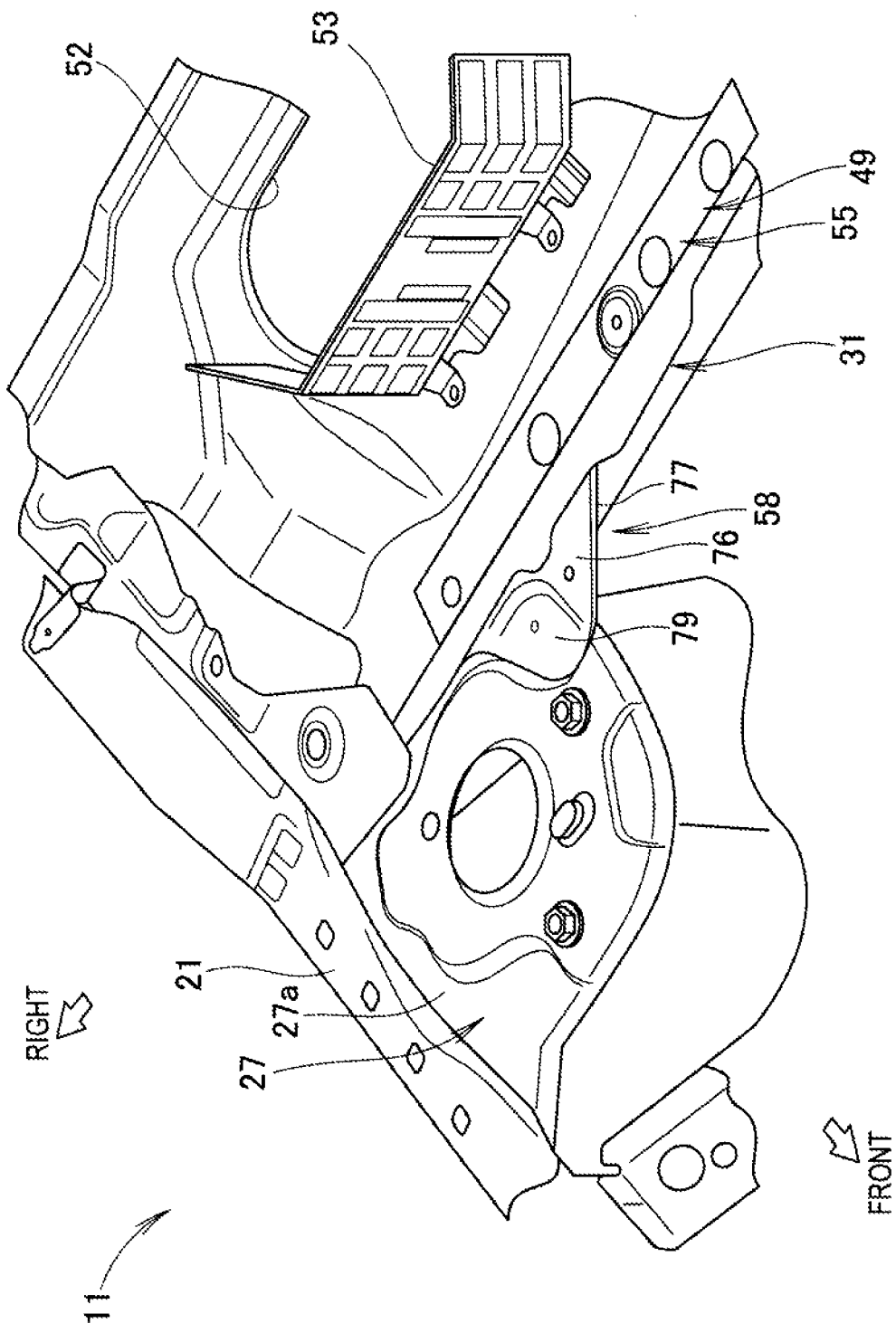
FIG. 22 is a perspective view of a right damper housing of FIG. 1.
Figure 23:
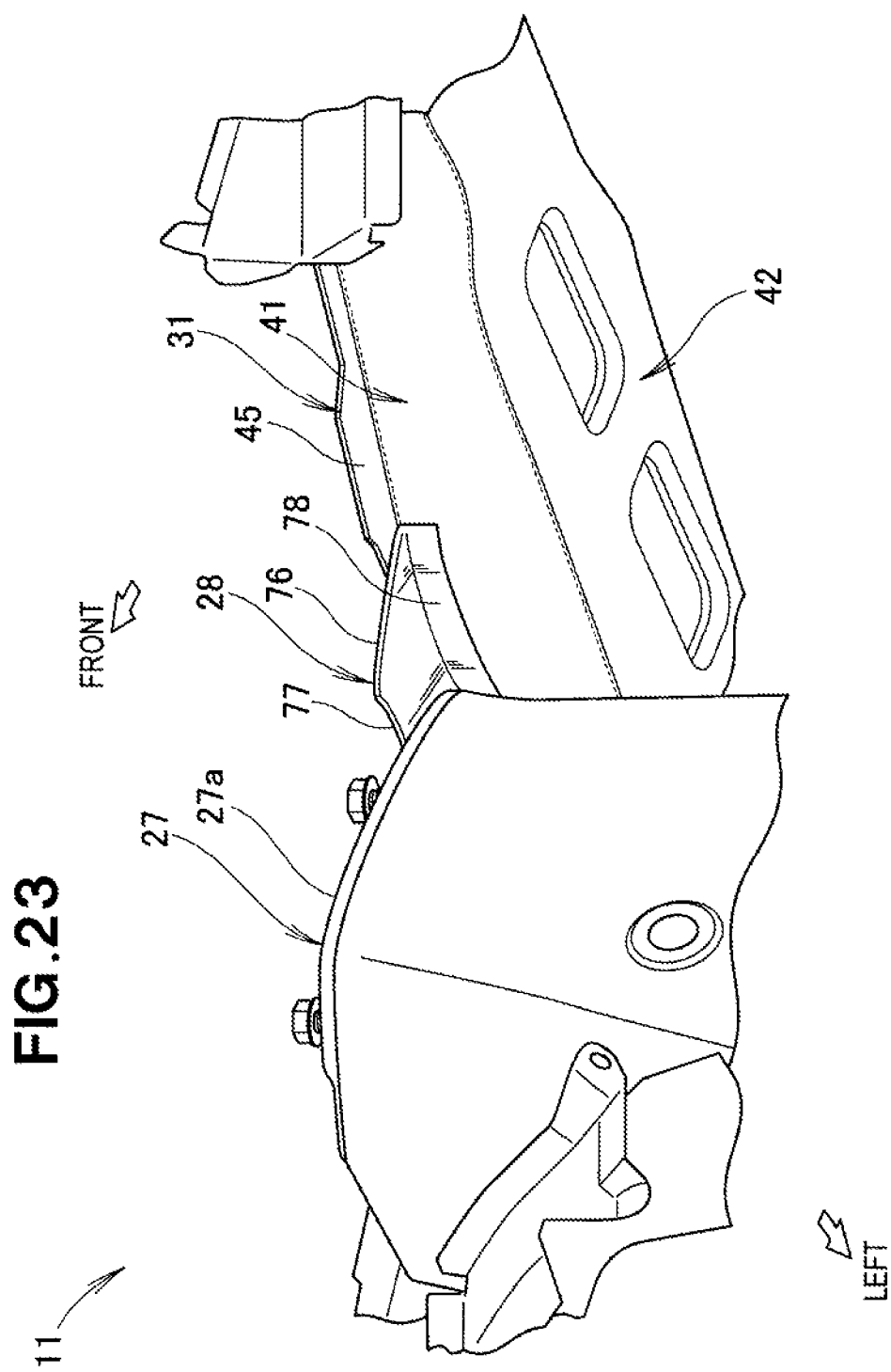
FIG. 23 is a perspective view of a right stiffener of FIG. 22 as viewed from below the vehicle front part.

As shown in FIG. 22, on the right side (the other lateral side) of the vehicle body, the right stiffener 58 has a stiffener body 76, a front flange 77, a rear flange 78 (FIG. 23), and a housing junction part 79. A joint structure between the right stiffener 58 and the linear part 55 of the cowl reinforcing member 49 is similar to that of the left stiffener 57 and the curved part 54. That is, the right stiffener 58 is joined with the linear part 55 of the cowl reinforcing member 49 as shown in FIG. 16, thereby increasing the rigidity of the vehicle body.

As described above, the windshield lower support member 32 supports the lower end 24*a* of the windshield 24 as shown in FIG. 5. The windshield lower support member 32 has the windshield supporting surface 81 formed to extend forward and downward, the upper surface 82 extending rearward from the windshield supporting surface 81, the rear surface 83 extending downward and rearward from the upper surface 82, and the horizontal flange 84 extending horizontally from the rear surface 83.

At the laterally central part of the vehicle body, the windshield lower support member 32 is provided with the windshield-lower-support-member reinforcing stay 86 on the side facing the dashboard upper panel 31. The windshield-lower-support-member reinforcing stay 86 has the front flange 87 formed to fit along the windshield supporting surface 81, the stay body 88 extending obliquely rearward and downward from the front flange 87, and the rear flange 89 extending rearward from the stay body 88.

The rear flange 89 of the windshield-lower-support-member reinforcing stay 86 is joined together with the horizontal flange 84 of the windshield lower support member 32 and the rear horizontal flange 46 of the dashboard upper panel 31.

Figure 24:
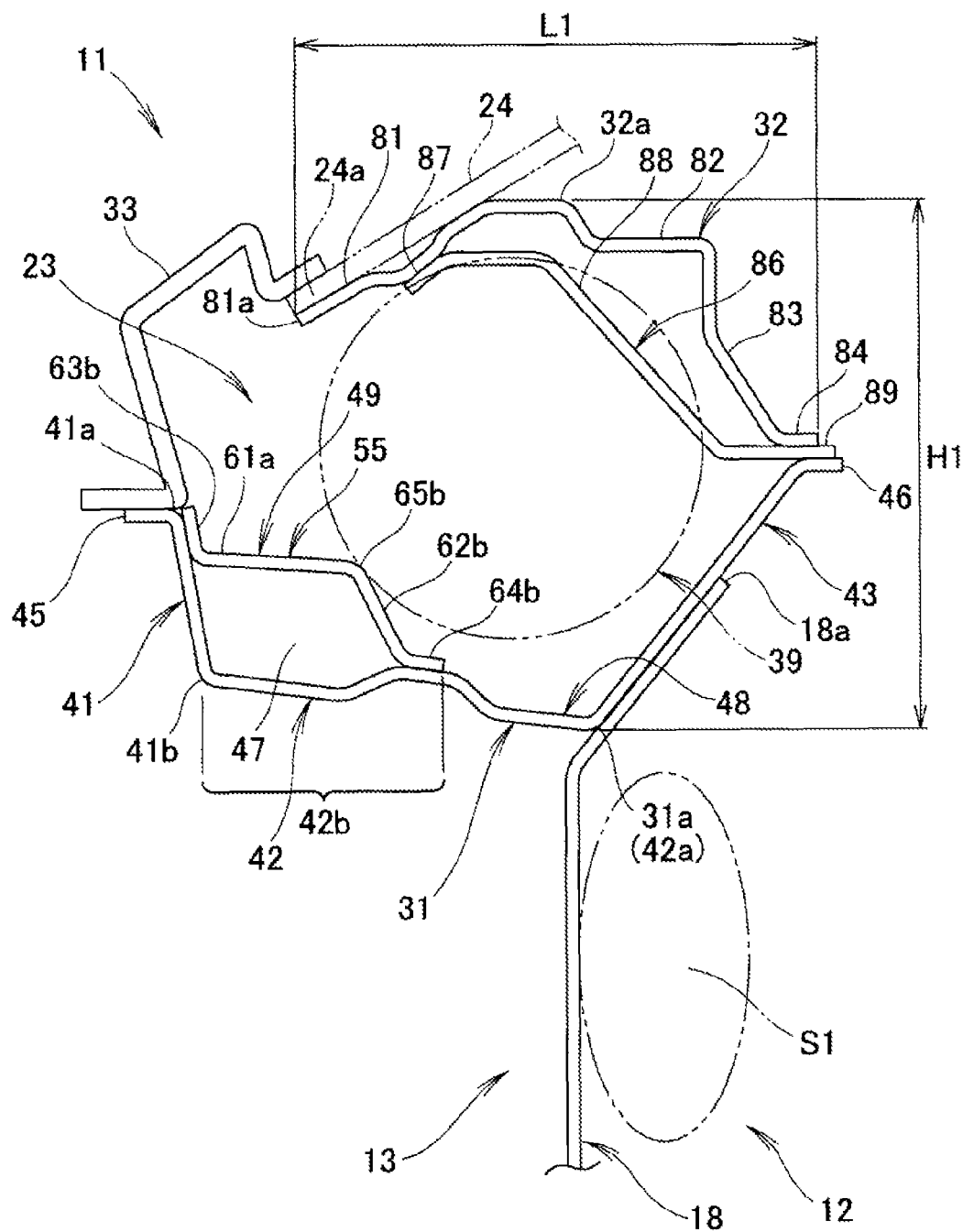
FIG. 24 is a view of a cowl box of FIG. 5.

As shown in FIG. 24, at the laterally central part of the cowl box (space section) 23, the windshield lower support member 32 has a length L1 in the longitudinal direction of the vehicle body, and a height H1 from a lower end 31a of the dashboard upper panel 31 to an upper end 32a of the windshield lower support member 32 is set to be substantially equal to the length L1. In other words, the cowl box 23 has the space section formed thereinside by upward and downward recessed parts with the height H1 substantially equal to the length L1. With this arrangement, the projecting amount of the cowl box 23 toward the engine room 13 is reduced, so that maintenance property of the engine room 13 can be improved, while expanding the space inside the cabin 12. In the figure, reference character S1 denotes the expanded space inside the cabin 12.

Further, with the space section 23 formed to have a large size in the vertical direction, the outside air introduction passage 39 is formed with the large cross section, so that a sufficient intake air quantity to the air conditioner (not shown) can be ensured. Moreover, with a simple configuration of the cowl reinforcing member 49 formed of a steel plate bent into the L shape, the productivity can be enhanced. Since the cowl reinforcing member 49 forms the closed cross section 47 extending in the vehicle width direction together with the front vertical wall 41 and the horizontal bottom wall 42 of the dashboard upper panel 31, the vehicle body can have increased rigidity.

The cowl box 23 having the space section extending in the vehicle width direction is composed of the dashboard upper panel 31 mounted on the upper part of the dashboard lower panel 18, the windshield lower support member 32 joined to an upper rear part of the dashboard upper panel 31 to support the windshield 24, and the cowl top 33 mounted on an upper front part of the dashboard upper panel 31.

The dashboard upper panel 31 has the U-shaped cross section formed by the front vertical wall 41 extending in the height direction of the vehicle body, the horizontal bottom wall 42 extending from the lower end 41b of the front vertical wall 41 in the longitudinal direction of the vehicle body, and the rear inclined wall 43 extending obliquely upward and rearward from the rear end 42a of the horizontal bottom wall 42. By providing the cowl reinforcing member 49 within the space section of the cowl box 23 to extend between the front vertical wall 41 and the front part 42b of the horizontal bottom wall 42, the closed cross section 47 extending in the vehicle width direction is formed, so that the rigidity of the vehicle body in the vehicle width direction can be increased. Further, since the cowl reinforcing member 49 is formed in a simple shape, the productivity can be enhanced.

Since the upper edge 18a of the dashboard lower panel 18 is formed to fit along and joined to the rear inclined wall 43 extending obliquely upward and rearward, the projecting amount of the dashboard lower panel 18 toward the engine room 13 is reduced, so that maintenance property of the engine room 13 can be improved, while expanding the space inside the cabin 12.

Further, at the laterally central part of the cowl box 23, the cowl box 23 is configured so that the length L1 of the windshield lower support member 32 in the longitudinal direction of the vehicle body is substantially equal to the height H1 from the lower end 31a of the dashboard upper panel 31 to the upper end 32a of the windshield lower support member 32. By forming the space section inside the cowl box 23 to be large in the vertical direction, the sufficient intake air quantity to the air conditioner (not shown) can be ensured.

The dashboard lower panel 18 has the brake master cylinder mounting part 37 for mounting thereon the brake master cylinder 36, as shown in FIG. 2. The dashboard upper panel 31 has the recessed section 51 formed in the horizontal bottom wall 42 to be recessed upward above the brake master cylinder mounting part 37.

The cowl reinforcing member 49 is composed of, as shown in FIG. 3, the curved part 54 located above the brake master cylinder mounting part 37 and formed to curve upward in front view, and the linear part 55 located away from the brake master cylinder mounting part 37 in the vehicle width direction and formed linearly in front view. Since the strength and rigidity of the linear part 55 are greater than those of the curved part 54, the linear part 55 can be formed of a plate thinner than the curved part 54, which contributes to weight reduction of the vehicle body.

As shown in FIGS. 17 and 24, the cowl reinforcing member 49 is formed of a steel plate bent into the L shape having the reinforcing upper walls 61a, 61b and the reinforcing rear walls 62a, 62b. The front end flanges 63a, 63b extend from the reinforcing upper walls 61a, 61b to be joined to the front vertical wall 41 of the dashboard upper panel 31, and the rear end flanges 64a, 64b extend from the reinforcing rear wall 62a, 62b to be joined to the horizontal bottom wall 42 of the dashboard upper panel 31, thereby forming the closed cross section 47.

With corner sections (ridges 65a, 65b) being formed by the reinforcing upper walls 61a, 61b and the reinforcing rear walls 62a, 62b of the cowl reinforcing member 49, the closed cross section 47 can be formed in a simple shape by only a few members to thereby increase the strength and rigidity of the dashboard upper panel 31. As a result, the weight of the vehicle body can further be reduced, while increasing the strength and rigidity thereof at a low cost.

As shown in FIG. 3, the left and right damper housings 27 for supporting the damper units 38 are provided forward of the dashboard lower panel 18. The opposite ends 54a, 55a of the cowl reinforcing member 49 in the vehicle width direction are joined to the stiffeners 57, 58 mounted on the front vertical wall 41 of the dashboard upper panel 31, respectively, and joined to the upper walls 27a, 27a of the damper housings 27, 27 via the stiffeners 57, 58, so that the vehicle body can have increased rigidity. Further, since there is no need to bend forward the opposite ends 31b, 31b of the dashboard upper panel 31 toward the upper walls 27a, 27a of the damper housings 27, 27 in order to join the opposite ends 31b, 31b thereto, reduction of the strength and rigidity of the dashboard upper panel 31 can be suppressed, while facilitating the manufacture thereof.

As shown in FIGS. 3 and 17, the cowl opening reinforcing member 66 for reinforcing the dashboard upper panel 31 having the U-shaped cross section is attached to extend between the linear part 55 of the cowl reinforcing member 49 and the rear inclined wall 43 of the dashboard upper panel 31, so that the dashboard upper panel 31 can have increased strength in the longitudinal direction of the vehicle body.

Further, the wiper motor mounting brackets 67, 68 for mounting thereon the wiper motor 69 for wiping the windshield 24 are attached to extend between the curved part 54 of the cowl reinforcing member 49 and the rear inclined wall 43 of the dashboard upper panel 31, so that the dashboard upper panel 31 can have further increased strength in the longitudinal direction of the vehicle body, while reinforcing the curved part 54 of the cowl reinforcing member 49. As a result, it is also possible to make the cowl reinforcing member 49 thinner.

As shown in FIG. 4, the dashboard lower panel 18 is provided with a dashboard cross member 35 mounted on a surface of the dashboard lower panel 18 facing the cabin 12 and extending in the vehicle width direction, and the brake master cylinder mounting part (brake master cylinder reinforcing plate) 37 for mounting thereon the brake master cylinder 36 (FIG. 2). On the one lateral side, i.e. left, side, of the vehicle body 11, an accelerator pedal bracket 103 for supporting an accelerator pedal 102, and a steering shaft joint cover 105 for covering a steering shaft 104 are provided.

Further, the dashboard lower panel 18 has the inclined flange 93 formed at the upper end 18a (FIG. 5) thereof, the side edge flanges 94, 94 joined to the front-pillar inner panels 19a, 19a of the front pillars 19, 19, and wheel house parts 101, 101 formed to constitute rear parts of the wheel houses 28, 28 (FIG. 1).

The wheel house parts 101, 101 of the dashboard lower panel 18 are each formed in a curved shape bulging toward the cabin 12 to have increased rigidity. The wheel house parts 101, 101 constitute the rear parts of the wheel houses 28, 28.

Figure 25:
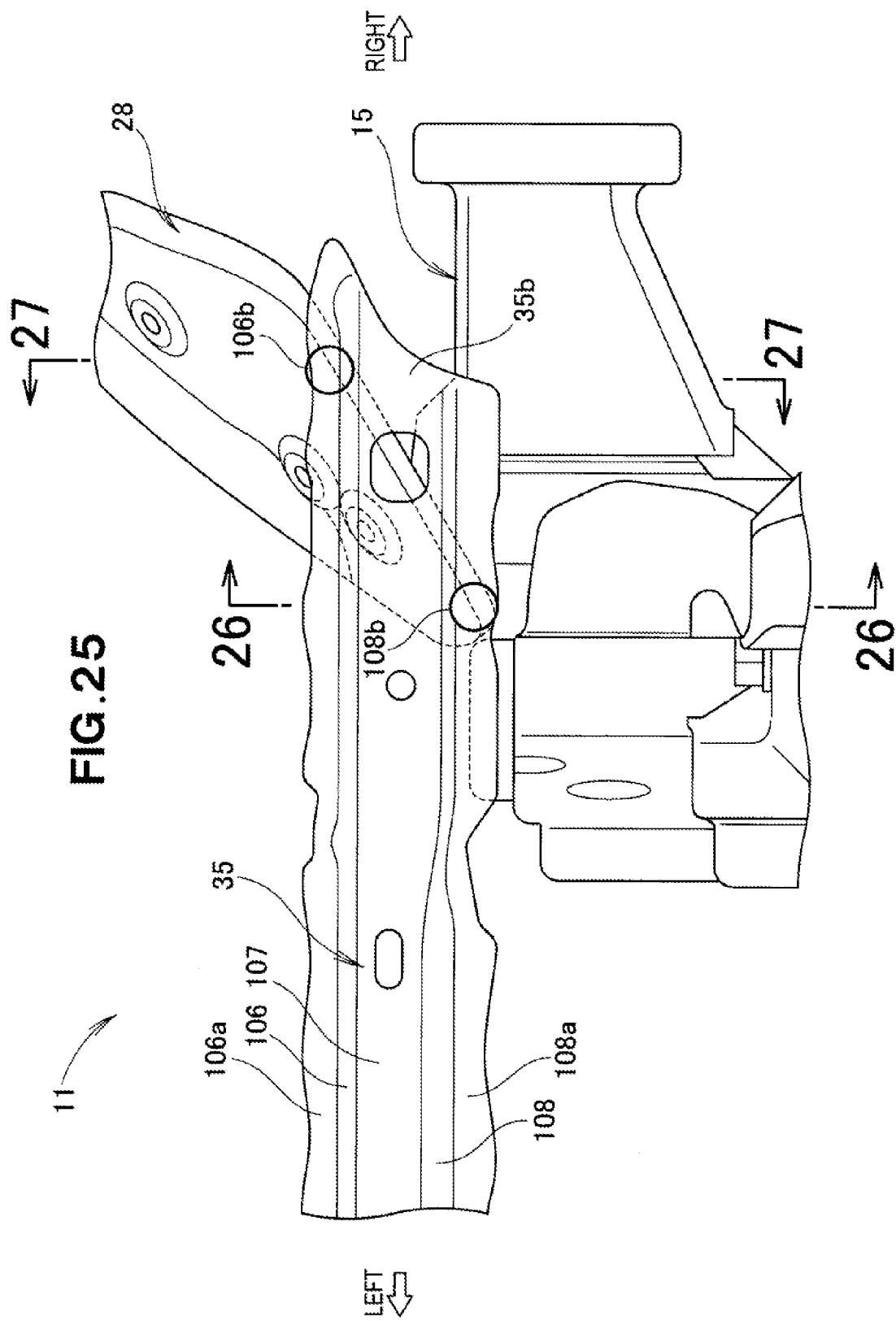
FIG. 25 is a partial view of the vehicle front structure of FIG. 1 as viewed from the cabin side with the dashboard lower panel removed.
Figure 26:
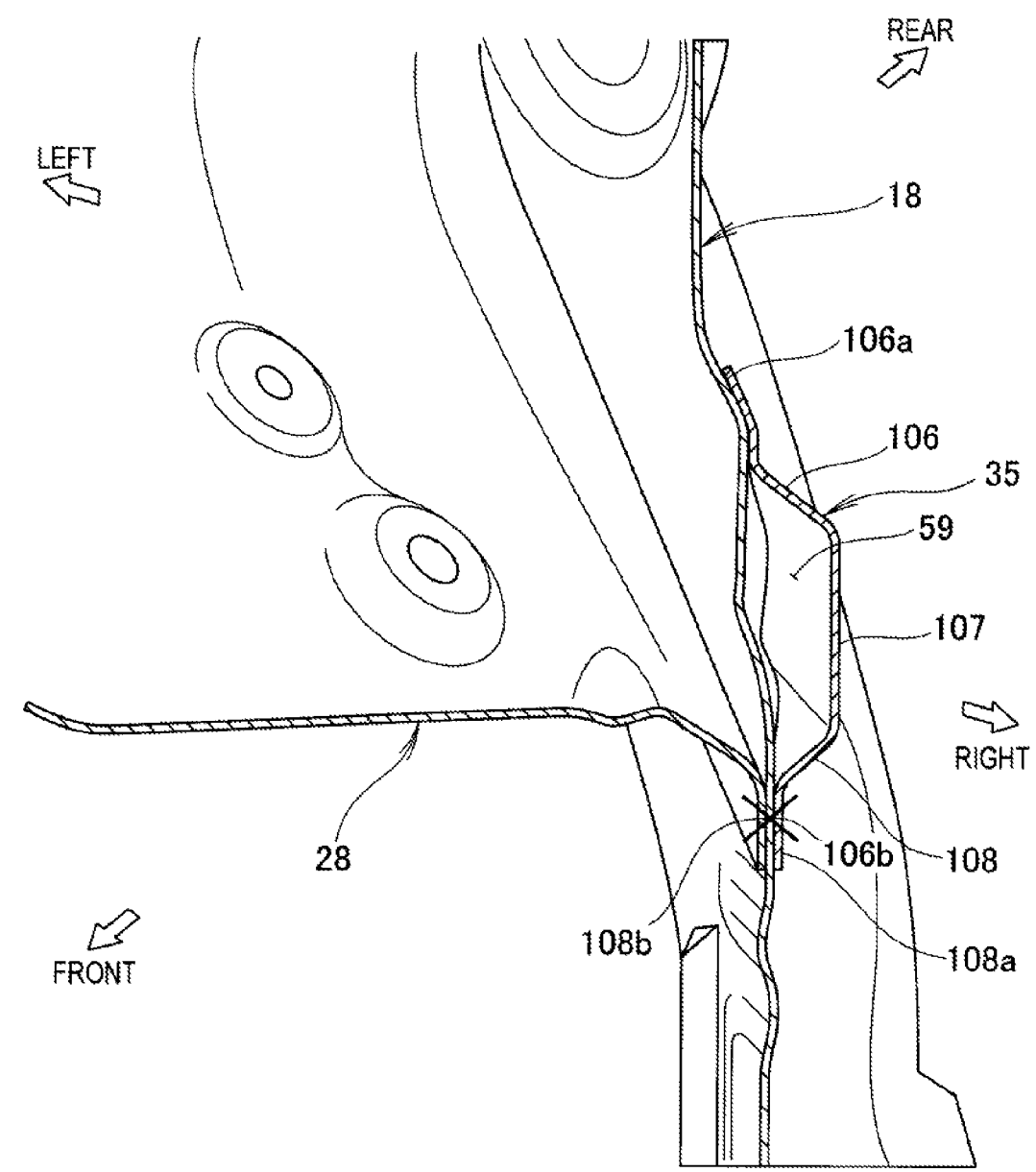
FIG. 26 is an enlarged cross-sectional view taken along line 28-26 of FIG. 25.
Figure 27:
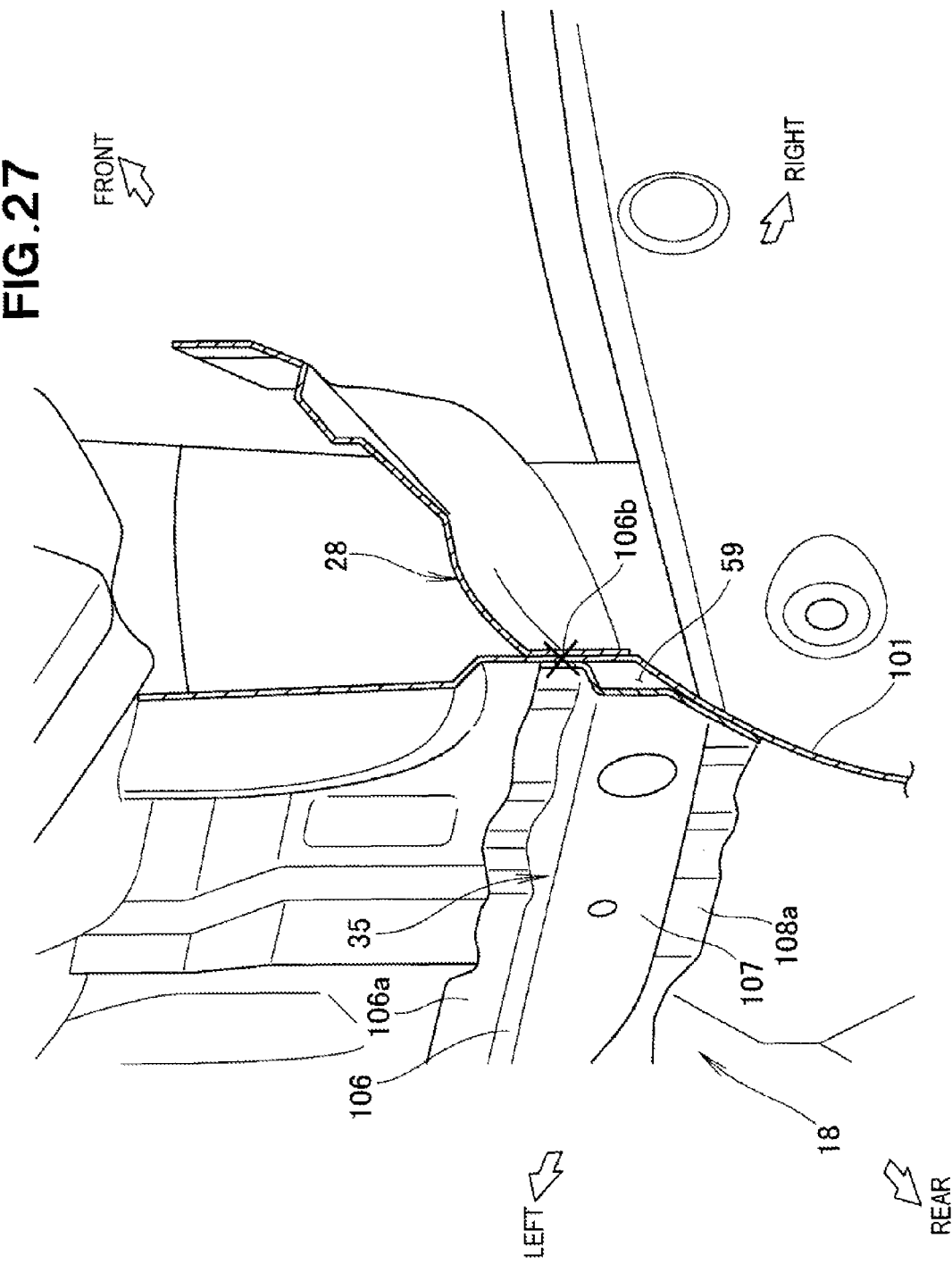
FIG. 27 is an enlarged cross-sectional view taken along line 27-27 of FIG. 25.
Figure 28:
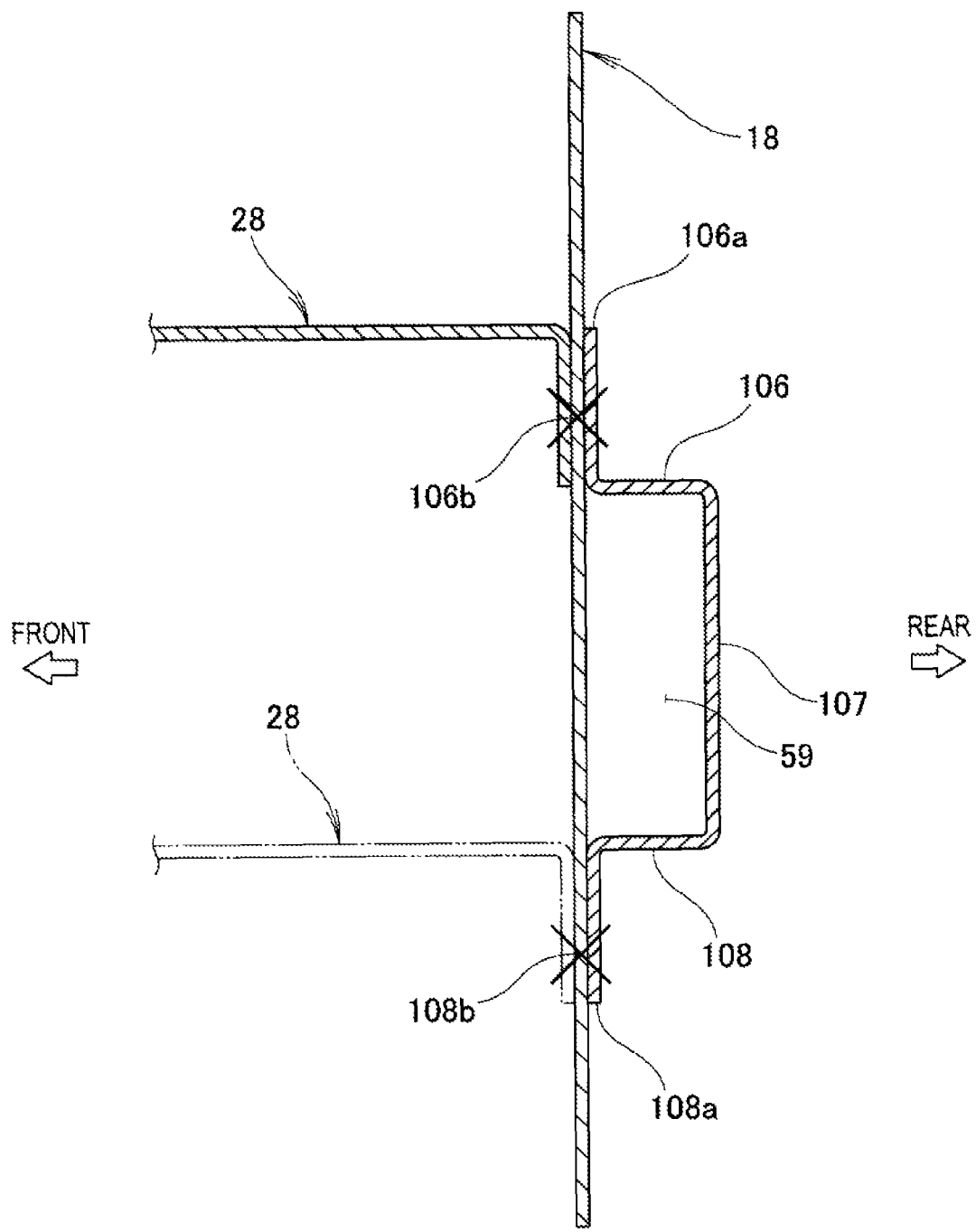
FIG. 28 is a cross-sectional view showing a joint relationship between a dashboard cross member and a wheel house of FIG. 27.

As shown in FIGS. 25 and 26, the dashboard cross member 35 has a U-shaped cross section formed by an upper wall 106, a vertical wall 107, and a lower wall 108. The dashboard cross member 35 further has an upper flange 106a extending upward from the upper wall 106, and a lower flange 108a extending downward from the lower wall 108. The upper flange 106a and the lower flange 108a are joined to the wheel house 28 at a first junction part 106b and a second junction part 108b, respectively.

Figure 29:
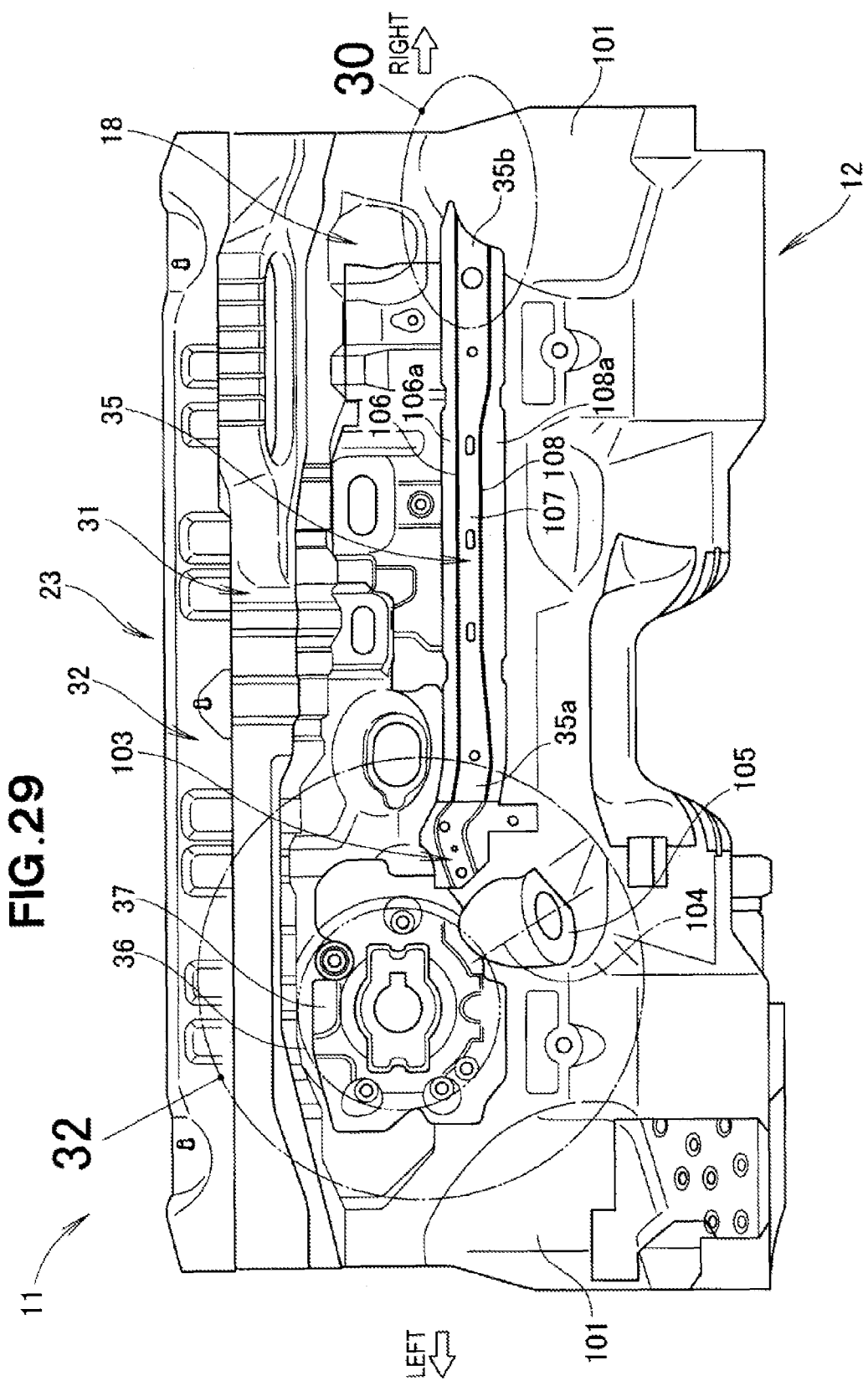
FIG. 29 is a back view of the vehicle front structure of FIG. 1.
Figure 32:
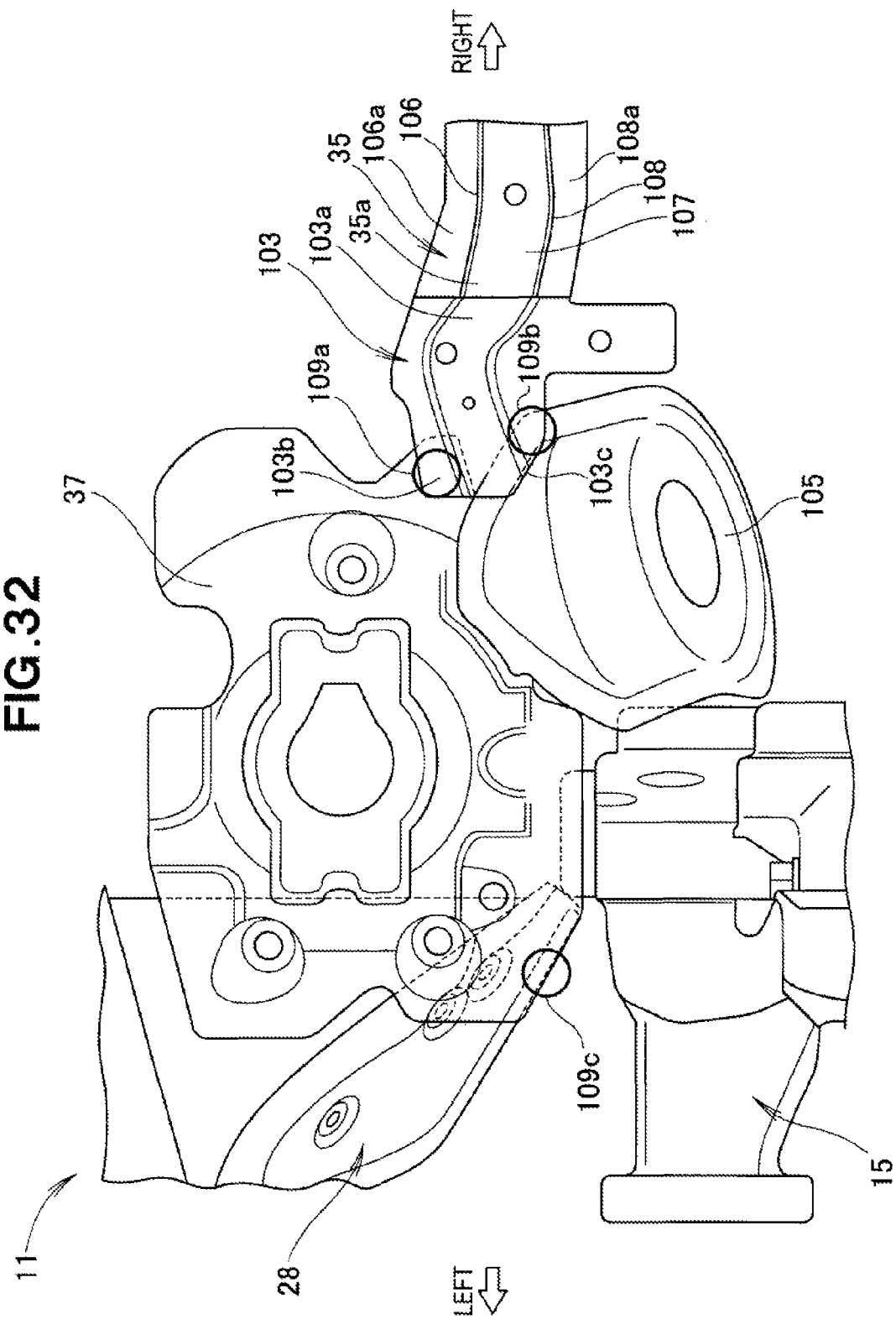
FIG. 32 is an enlarged view of section 32 of FIG. 29 with the dashboard lower panel removed.

As shown in FIGS. 29 and 32, the accelerator pedal bracket 103 has a right end 103a joined to one end (left end) 35a of the dashboard cross member 35, an upper left, end 103b joined to the brake master cylinder mounting part 37 at a third junction part 109a, and a lower left end 103c joined to the steering shaft joint cover 105 at a fourth junction part 109b. The brake master cylinder mounting part 37 is joined to the left wheel house 28 at a fifth junction part 109c.

In this manner, the dashboard cross member 35 is joined at the one end (left end) 35a to the corresponding one of the wheel houses 28, 28 (i.e., left wheel house 28) with the accelerator pedal bracket 103 and the brake master cylinder mounting part 37 interposed therebetween.

Figure 30:
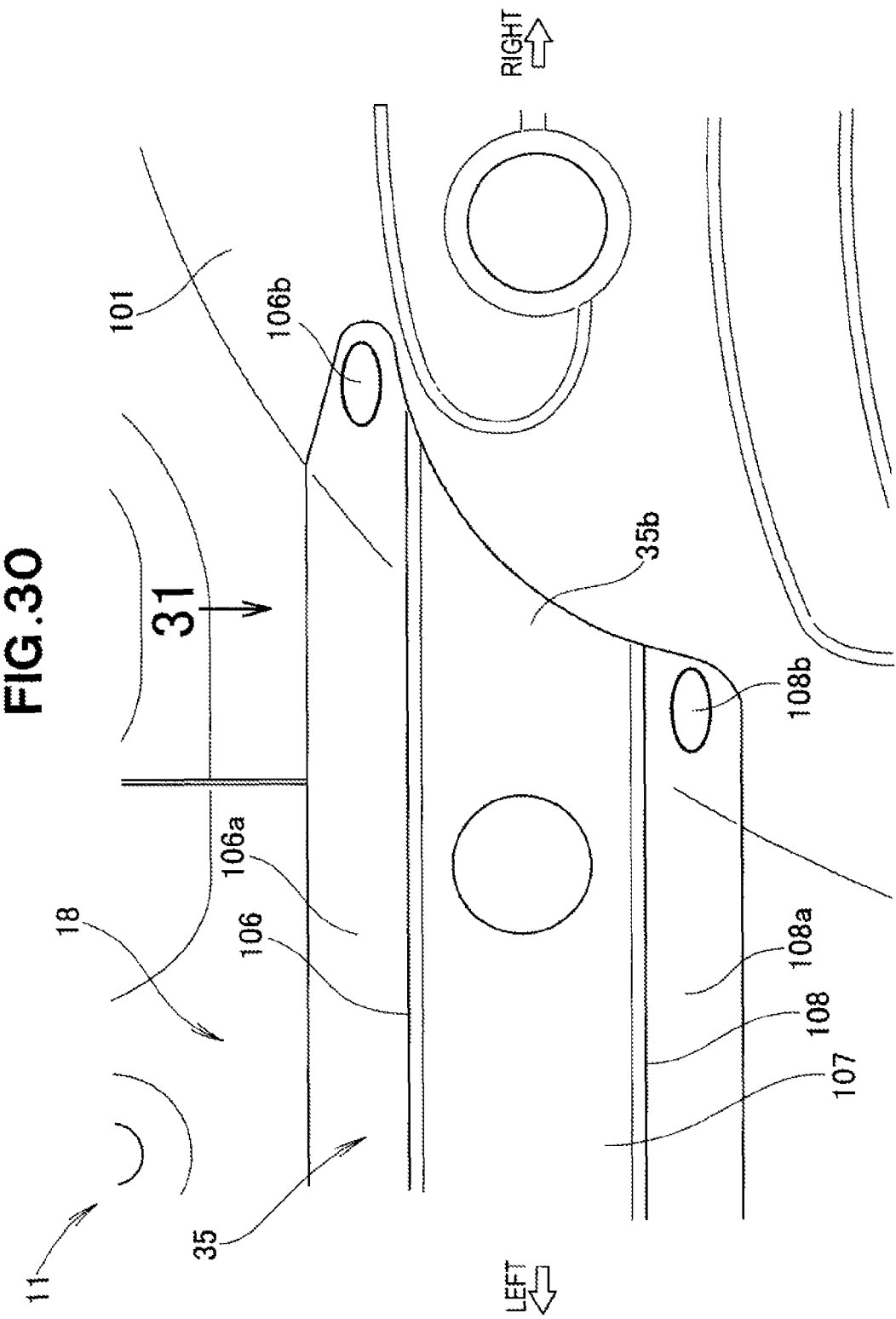
FIG. 30 is an enlarged view of section 30 of FIG. 29.
Figure 31:
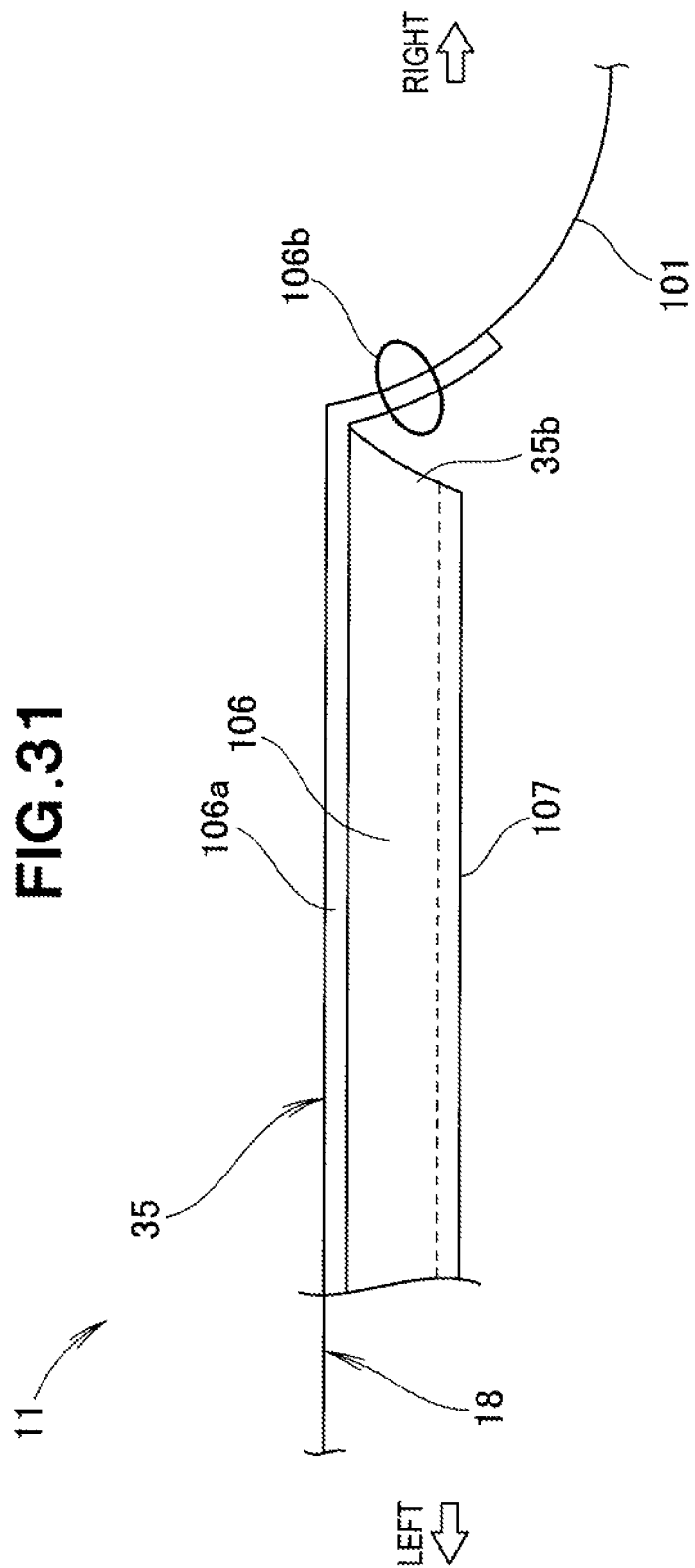
FIG. 31 is a view showing a joint relationship between the dashboard cross member and a wheel house part of the dashboard lower panel as viewed from a direction indicated by arrow 31 of FIG. 30.

As shown in FIGS. 30 and 31, the dashboard cross member 35 is also joined at the other end (right end) 35b to the right wheel house part 101 (corresponding one of the wheel house parts 101, 101). Further, as shown in FIG. 26, the dashboard cross member 35 forms a closed cross section 59 together with the dashboard lower panel 18, and is joined to the right wheel house 28 (the other one of the wheel houses 28, 28) with the dashboard lower panel 18 sandwiched therebetween.

By thus joining the dashboard cross member 35 to the wheel house 28 with the dashboard lower panel 18 sandwiched therebetween, and forming the closed cross section 59 by the dashboard lower panel 18 and the dashboard cross member 35, vibration transmitted from the damper housings 27, 27 to the dashboard lower panel 18 via the wheel houses 28, 28 can be attenuated. By suppressing vibration of the dashboard lower panel 18, noise inside the cabin 12 can be reduced.

Further, since the dashboard cross member 35 is joined to the wheel house part 101 formed in the curved shape and having increased rigidity, there is no need to elongate the dashboard cross member 35 to reach the front pillar 19, so that the weight of the vehicle body 11 can be reduced, while reinforcing the wheel house part 101.

Also, as shown in FIG. 32, by joining the dashboard cross member 35 at the one end 35a to the left wheel house 28 (corresponding one of the wheel houses 28, 28) with the accelerator pedal bracket 103 and the brake master cylinder mounting part 37 interposed therebetween, there is no need to elongate the dashboard cross member 35 to reach the front pillar 19 on this side, so that the weight of the vehicle body 11 can be further reduced.

As shown in FIG. 1, and 25 to 32, the vehicle front part includes the dashboard lower panel 18 that partitions the vehicle body 11 in the longitudinal direction thereof, the left and right wheel houses 28, 28 mounted on a surface of the dashboard lower panel 18 facing the engine room 13, and the damper housings 27, 27 provided forward of the dashboard lower panel 18.

The dashboard lower panel 18 is provided with the dashboard cross member 35 mounted on the surface of the dashboard lower panel 18 facing the cabin 12 and extending in the vehicle width direction so that the dashboard lower panel 18 and the dashboard cross member 35 together form the closed cross section 59. With the closed cross section 59 formed by the dashboard lower panel 18 and the dashboard cross member 35, vibration transmitted from the damper housings 27, 27 to the dashboard lower panel 18 via the wheel houses 28, 28 can be attenuated. Further, the dashboard cross member 35 is joined to the wheel houses 28, 28 with the dashboard lower panel 18 sandwiched therebetween, so that vibration of the wheel houses 28, 28 can be suppressed. By thus reducing vibration transmitted from the wheel houses 28, 28 to the dashboard lower panel 18, noise inside the cabin 12 can be reduced. As a result, it is possible to improve quietness inside the cabin 12.

The dashboard lower panel 18 has the wheel house parts 101, 101 formed in the curved shape bulging toward the cabin 12 to have increased rigidity and constituting the rear parts of the wheel houses 28, 28. Since the dashboard cross member 35 is joined to the wheel house part 101 having increased rigidity, predetermined strength and rigidity of the vehicle front part can be ensured without elongating the dashboard cross member 35 to reach the front pillar 19. Thus, the dashboard cross member 35 can be shortened and the weight of the vehicle front part can thereby be reduced, while increasing the strength and rigidity of the wheel house part 101.

The dashboard lower panel 18 is provided with, on the one lateral side (left side) of the vehicle body 11, the accelerator pedal bracket 103 for supporting the accelerator pedal 102, and the brake master cylinder mounting part 37 for mounting thereon the brake master cylinder 36. Since the dashboard cross member 35 is joined at the one end (left end) 35a to the corresponding one of the wheel houses 28, 28 (left wheel house 28) with at least either of the accelerator pedal bracket 103 and the brake master cylinder mounting part 37 interposed therebetween, the dashboard cross member 35 can be further shortened and the weight of the vehicle front part can be further reduced.

Figure 33:
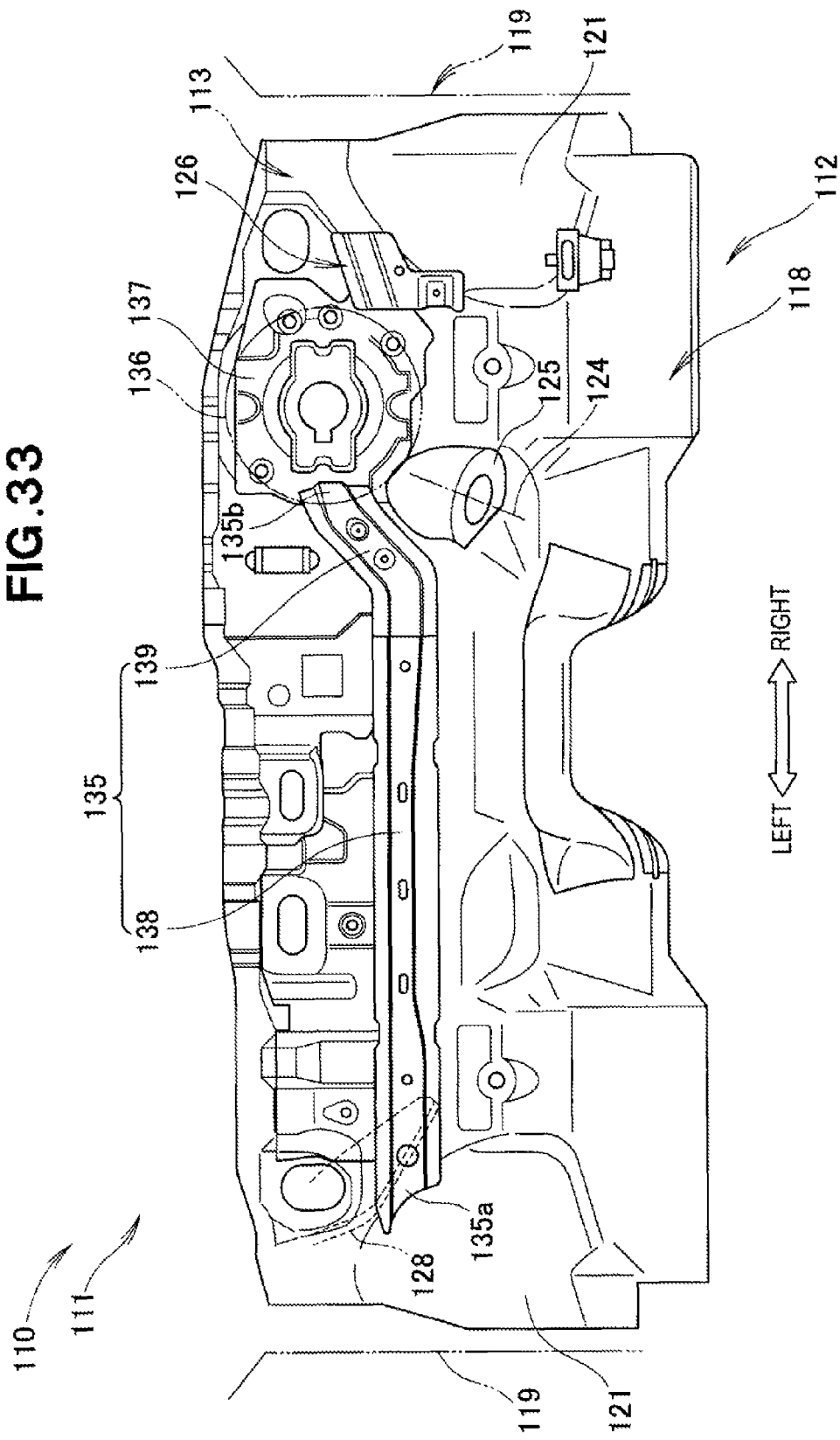
FIG. 33 is a back view of a vehicle front structure according to another embodiment of the present invention.
Figure 34:
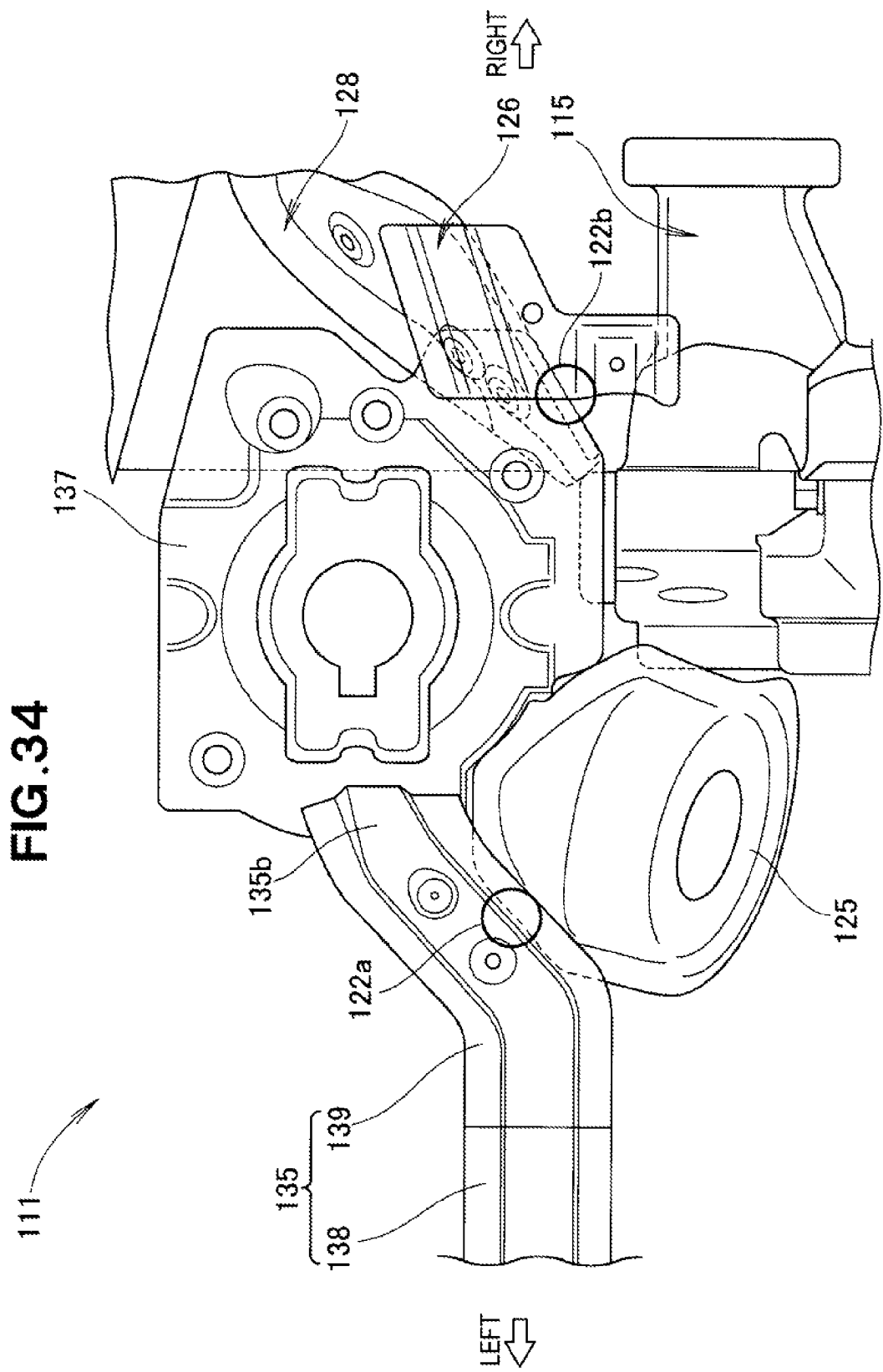
FIG. 34 is an enlarged view of a right part of the vehicle front structure of FIG. 33 with a dashboard lower panel removed.
Figure 35:
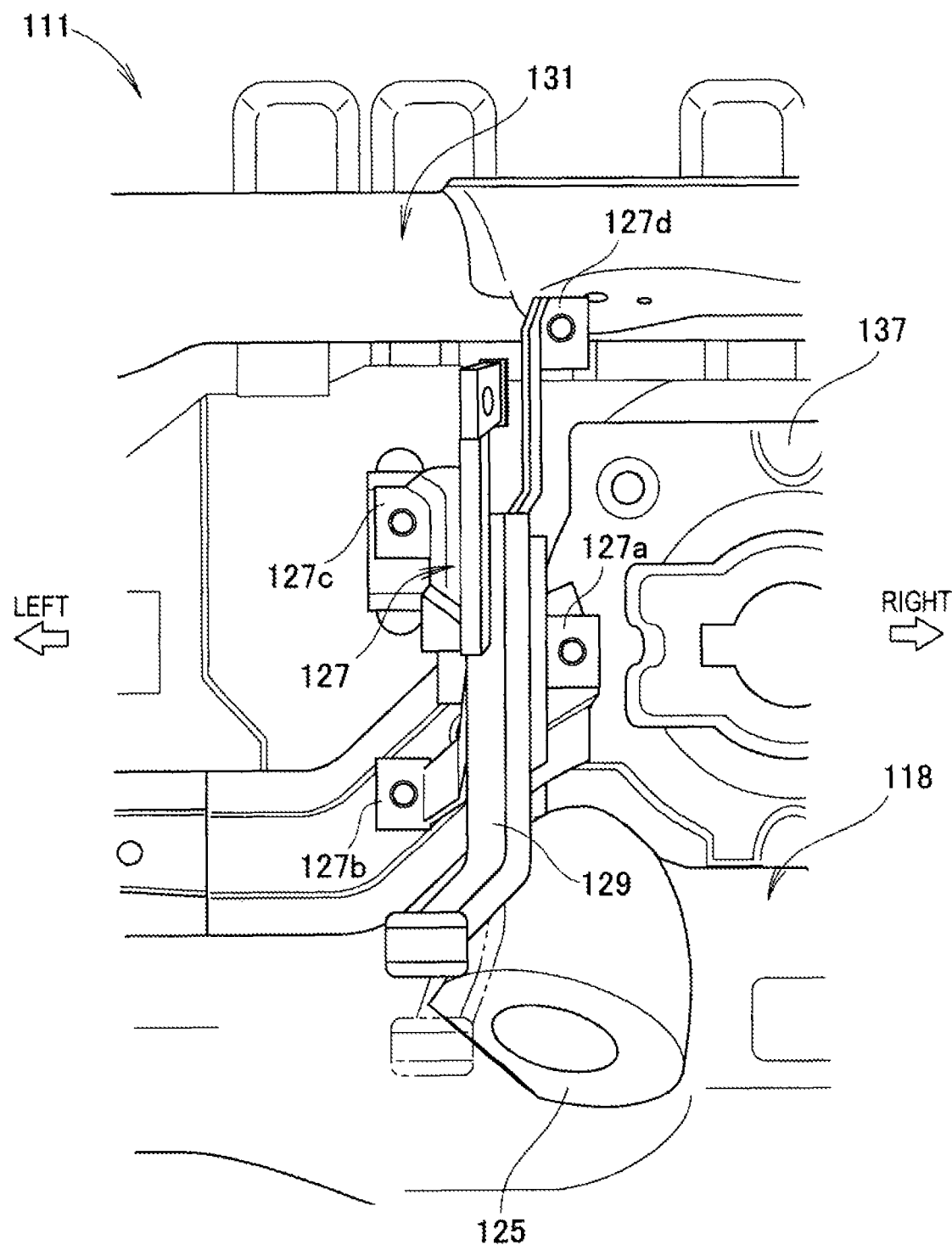
FIG. 35 is a back view of the vehicle front structure of FIG. 33 with a parking pedal mounted.

Another or second embodiment of the present invention is shown in FIGS. 33 to 35. A vehicle 110 of the embodiment includes, in a front part of a vehicle body 111, left and right front side frames 115, 115 (one of which is not shown) extending in a longitudinal direction of the vehicle body, a dashboard lower panel 118 that partitions the vehicle body 111 in the longitudinal direction thereof, a dashboard upper panel 131 (FIG. 35) mounted on an upper part of the dashboard lower panel 118, left and right wheel houses 128, 128 mounted on a surface of the dashboard lower panel 118 facing an engine room 113, and left and right front pillars 119, 119 mounted on opposite lateral sides of the dashboard lower panel 18. The vehicle 110 is a right-hand drive vehicle.

The dashboard lower panel 118 is provided with a dashboard cross member 135 mounted on a surface of the dashboard lower panel 118 facing a cabin 112 and extending in a vehicle width direction, and a brake master cylinder mounting part (brake master cylinder reinforcing plate) 137 for mounting thereon a brake master cylinder 136, a supporting bracket 127 (FIG. 35) for supporting a vehicle-mounted part 129, an accelerator pedal bracket 126 for supporting an accelerator pedal (not shown), and a steering shaft joint cover 125 for covering a steering shaft 124. The dashboard lower panel 118 has wheel house parts 121, 121 formed to constitute rear parts of the left and right wheel houses 128, 128.

The accelerator pedal bracket 128, the brake master cylinder mounting part 137, the steering shaft joint cover 125, and the supporting bracket 127 are provided on the right side of the vehicle body 111. The vehicle-mounted part 129 is more particularly a parking pedal.

The dashboard cross member 135 is connected with the dashboard upper panel 131 via the supporting bracket 127. As shown in FIG. 35, the supporting bracket 127 has first and second junction parts 127a, 127b joined to the dashboard cross member 135, a third junction part 127c joined to the dashboard lower panel 118, and a fourth junction part 127d joined to the dashboard upper panel 131.

By connecting the dashboard cross member 135 with the dashboard upper panel 131 via the supporting bracket 127 for supporting the parking pedal (vehicle-mounted part) 129, the dashboard cross member 135 is reinforced.

As shown in FIG. 33, the dashboard cross member 135 is composed of a linear part 138 on one lateral side (left side), and a curved part 139 on the other lateral side (right side). The dashboard cross member 135 is joined at one end (left end) 135a to the corresponding one of the wheel houses 128, 128 (left wheel house 128) with the dashboard lower panel 118 sandwiched therebetween.

The dashboard cross member 135 is joined at the one end (left end) 135a to the corresponding one of the wheel houses 128, 128 (left wheel house 128) with the dashboard lower panel 118 sandwiched therebetween. The dashboard cross member 135 is joined also at the one end (left end) 135a to the left wheel house part 121 (corresponding one of the wheel house parts 121, 121).

As shown in FIG. 34, the dashboard cross member 135 is joined at the other end (right end) 135b to the other one of the wheel houses 128, 128 (right wheel house 128) with the brake master cylinder mounting part 137 interposed therebetween.

More specifically, the curved part 139 of the dashboard cross member 135 is joined to the steering shaft joint cover 125 at a junction part 122a, and the other end (right, end) 135b of the dashboard cross member 135 is joined to the brake master cylinder mounting part 137. The brake master cylinder mounting part 137 is joined to the accelerator pedal bracket 126 and the wheel house 128 at a junction part 122b.

By joining the dashboard cross member 135 at the other end (right end) 135b to the right wheel house 128 with the brake master cylinder mounting part 137 interposed therebetween, the vehicle body can have increased rigidity without elongating the dashboard cross member 135 to reach the corresponding front pillar 119.

As shown in FIGS. 33 to 35, in the vehicle front structure according to the second embodiment, the dashboard lower panel 118 is provided with on the other lateral side of the vehicle body 111 the brake master cylinder mounting part 137 for mounting thereon the brake master cylinder 136. While the dashboard cross member 135 is joined at the one end (left end) 135a to the corresponding one of the wheel houses 128, 128 (left wheel house 128), the dashboard cross member 135 is joined at the other end (right end) 135b to the other one of the wheel houses 128, 128 (right wheel house 128) with the brake master cylinder mounting part 137 interposed therebetween. Thus, there is no need to elongate the other end (right end) 135b of the dashboard cross member 135 to reach the corresponding front pillar 119, and therefore the weight of the vehicle front part can be further reduced.

The dashboard upper panel 131 is mounted on the upper part of the dashboard lower panel 118, and the dashboard lower panel 118 is provided with the supporting bracket 127 for supporting the parking pedal (vehicle-mounted part) 129. By connecting the dashboard crass member 135 with the dashboard upper panel 131 via the supporting bracket 127, the dashboard cross member 135 is reinforced by the supporting bracket 127. Thus, it is also possible to make the dashboard cross member 135 thinner, which contributes to weight reduction of the vehicle front part.

Although the vehicle-mounted part 129 in the vehicle front structure of the second embodiment is the parking pedal as shown in FIG. 35, the invention is not so limited, and the vehicle-mounted part 129 may be a steering hanger, etc.

In the above-described embodiment, although the dashboard cross member 35 is joined at the one end (left end) 35a to the corresponding one of the wheel houses 28, 28 (left wheel house 28) with the accelerator pedal bracket 103 and the brake master cylinder mounting part 37 interposed therebetween as shown in FIG. 32, the invention is not so limited, and the dashboard cross member 35 may be joined at the one end (left end) 35a to the corresponding one of the wheel houses 28, 28 (left wheel house 28) with at least either of the accelerator pedal bracket 103 and the brake master cylinder mounting part 37 interposed therebetween. With such a configuration, the dashboard cross member 35 can be further shortened and the weight of the vehicle front part can be further reduced.

Although the vehicle 10 shown in FIG. 1, which employs the vehicle front structure according to the present invention, is a left-hand drive vehicle, the vehicle body 11 may be configured for a right-hand drive vehicle by arranging the parts thereof to be laterally reversed.

INDUSTRIAL APPLICABILITY

The vehicle front structure of the present invention is well suited for use in passenger vehicles such as sedan cars, wagon cars, etc.

REFERENCE CHARACTERS

11 . . . vehicle body, 12 . . . cabin, 13 . . . engine room, 18 . . . dashboard lower panel, 18a . . . upper end of the dashboard lower panel, 18b . . . lateral end of the dashboard lower panel, 18c . . . corner part of the dashboard lower panel, 19 . . . front pillar, 19a . . . front-pillar inner panel, 23 . . . cowl box (space section), 24 . . . windshield, 27 . . . damper housing, 27a . . . upper wall of the damper housing, 27b . . . rear wall of the damper housing, 28 . . . wheel house, 29 . . . wheel, 31 . . . dashboard upper panel, 31a . . . lower end of the dashboard upper panel, 31b . . . lateral end of the dashboard upper panel, 32 . . . windshield lower support member, 32a . . . upper end of the windshield lower support member, 33 . . . cowl top, 34 . . . closed cross section, 35 . . . dashboard cross member, 35a . . . one end, 35b . . . the other end, 36 . . . brake master cylinder, 37 . . . brake master cylinder mounting part (brake master cylinder reinforcing plate), 38 . . . damper unit, 41 . . . front vertical wall, 41b . . . lower end of the front vertical wall, 42 . . . horizontal bottom wall, 42a . . . rear end of the horizontal bottom wall, 43 . . . rear inclined wall, 43a . . . lower part of the rear inclined wall, 43b . . . back surface of the rear inclined wall, 44 . . . opening (cowl opening), 45 . . . front horizontal flange, 46 . . . rear horizontal flange, 47 . . . closed cross section, 49 . . . cowl reinforcing member, 51 . . . recessed section, 54 . . . curved part, 54a . . . lateral end of the cowl reinforcing member, 55 . . . linear part, 55a . . . lateral end of the cowl reinforcing member, 57, 58 . . . stiffener, 59 . . . closed cross section, 61a, 61b . . . reinforcing upper wall, 62a, 62b . . . reinforcing rear wall, 63a, 63b . . . front end flange, 64a, 64b . . . rear end flange, 67, 68 . . . first and second wiper motor mounting brackets, 69 . . . wiper motor, 93 . . . inclined flange, 94 . . . side edge flange, 95 . . . L-shaped waterproof wall, 96, 97 . . . first and second beads, 98 . . . first welding gun, 99 . . . second welding gun, L1 . . . length of the windshield lower support member in a longitudinal direction of the vehicle body, H1 . . . height from the lower end of the dashboard upper panel to the upper end of the windshield lower support member, 101 . . . wheel house part, 102 . . . accelerator pedal, 103 . . . accelerator pedal bracket, 111 . . . vehicle body, 118 . . . dashboard lower panel, 127 . . . supporting bracket, 128 . . . wheel house, 129 . . . vehicle-mounted part (parking pedal), 131 . . . dashboard upper panel, 135 . . . dashboard cross member, 135a . . . one end (left end), 135b . . . the other end (right end), 136 . . . brake master cylinder, 137 . . . brake master cylinder mounting part

The invention claimed is:

1. A vehicle front structure comprising:
    a dashboard lower panel having opposite ends in a vehicle width direction joined to left and right front pillars;
    a dashboard upper panel mounted on an upper part of the dashboard lower panel; and
    left and right damper housings provided forward of the dashboard lower panel,
    wherein the dashboard upper panel has a substantially U-shaped cross section opened upward and includes:
        a front vertical wall extending substantially vertically in a height direction of a vehicle body;
        a horizontal bottom wall extending from a lower end of the front vertical wall rearwardly and substantially horizontally in a longitudinal direction of the vehicle body; and
        a rear inclined wall extending obliquely upward and rearward from a rear end of the horizontal bottom wall,
    wherein the dashboard lower panel includes:
        a vertical wall; and
        an inclined flange formed at an upper end of the vertical wall, and
    wherein the inclined flange is joined to a lower part of the rear inclined wall so that the substantially U-shaped dashboard upper panel is supported at substantially a center thereof in the longitudinal direction of the vehicle body from below by the vertical wall of the dashboard lower panel.

2. The vehicle front structure of claim 1, wherein the dashboard lower panel includes side edge flanges joined to front-pillar inner panels of the front pillars, and wherein the inclined flange of the dashboard lower panel is formed continuously with the side edge flanges so as to form an L-shaped waterproof wall at each of corner parts of the dashboard lower panel.

3. The vehicle front structure of claim 1, wherein the substantially U-shaped dashboard upper panel is configured so that, when being mounted on the dashboard lower panel and the left and right damper housings from above, the rear inclined wall abuts on the inclined flange of the dashboard lower panel, and the front vertical wall and a front horizontal flange extending forward from an upper end of the front vertical wall abut respectively on rear walls and upper walls of the damper housings.

4. The vehicle front structure of claim 1, wherein the substantially U-shaped dashboard upper panel is provided with a windshield lower support member for supporting a windshield, the dashboard upper panel and the windshield lower support member together forming an opening opened forward and upward, and wherein the dashboard upper panel and the windshield lower support member are formed in such a shape that a first welding gun is allowed to be inserted from the opening, while a second welding gun is brought close to the first welding gun from behind the rear inclined wall of the dashboard upper panel, to thereby weld together the rear inclined wall of the dashboard upper panel and the inclined flange of the dashboard lower panel from both sides.

5. The vehicle front structure of claim 1, further comprising: wheel houses mounted below the damper housings to cover wheels, wherein each of opposite lateral ends of the dashboard upper panel forms a closed cross section together with the dashboard lower panel, a corresponding one of the damper housings, and a corresponding one of the wheel houses.

6. The vehicle front structure of claim 1, further comprising: a cowl top mounted on an upper front part of the substantially U-shaped dashboard upper panel to form a space section extending in the vehicle width direction; and a cowl reinforcing member provided within the space section to form a closed cross section extending in the vehicle width direction together with the front vertical wall and a front part of the horizontal bottom wall of the dashboard upper panel, wherein an upper edge of the dashboard lower panel is formed to fit along and joined to the rear inclined wall extending obliquely upward and rearward.

7. The vehicle front structure of claim 6, wherein the dashboard lower panel has a brake master cylinder mounting part for mounting thereon a brake master cylinder, the dashboard upper panel has a recessed section formed in the horizontal bottom wall to be recessed upward above the brake master cylinder mounting part, and the cowl reinforcing member has a curved part located above the brake master cylinder mounting part and formed to curve upward, and a linear part located away from the brake master cylinder mounting part in the vehicle width direction and formed linearly, the linear part being formed of a plate thinner than the curved part.

8. The vehicle front structure of claim 6, wherein the cowl reinforcing member is formed of a steel plate bent into an L shape having a reinforcing upper wall and a reinforcing rear wall, and has a front end flange extending from the reinforcing upper wall and a rear end flange extending from the reinforcing rear wall, and wherein the front end flange is joined to the front vertical wall of the dashboard upper panel, and the rear end flange is joined to the horizontal bottom wall of the dashboard upper panel, thereby forming the closed cross section.

9. The vehicle front structure of claim 6, wherein the left and right damper housings for supporting damper units are provided forward of the dashboard lower panel, and wherein opposite ends of the cowl reinforcing member in the vehicle width direction are joined to stiffeners mounted on the front vertical wall of the dashboard upper panel, respectively, and joined to the upper walls of the damper housings via the stiffeners.

10. The vehicle front structure of claim 7, further comprising: a cowl opening reinforcing member for reinforcing the substantially U-shaped dashboard upper panel having, the cowl opening reinforcing member being attached to extend between the linear part of the cowl reinforcing member and the rear inclined wall of the dashboard upper panel.

11. The vehicle front structure of claim 7, further comprising: wiper motor mounting brackets for mounting thereon a wiper motor, the wiper motor mounting brackets being attached to extend between the curved part of the cowl reinforcing member and the rear inclined wall of the dashboard upper panel.

12. A vehicle front structure comprising:
a dashboard lower panel having opposite ends in a vehicle width direction joined to left and right front pillars;
a dashboard upper panel mounted on an upper part of the dashboard lower panel; and
left and right damper housings provided forward of the dashboard lower panel,
wherein the dashboard upper panel includes:
a front vertical wall extending substantially vertically in a height direction of a vehicle body;
a horizontal bottom wall extending from a lower end of the front vertical wall substantially horizontally in a longitudinal direction of the vehicle body; and
a rear inclined wall extending obliquely upward and rearward from a rear end of the horizontal bottom wall,
wherein the dashboard lower panel includes:
a vertical wall; and
an inclined flange formed at an upper end of the vertical wall,
wherein the inclined flange is joined to a lower part of the rear inclined wall so that the dashboard upper panel is supported at substantially a center thereof in the longitudinal direction of the vehicle body from below by the vertical wall, and
wherein the dashboard lower panel is provided with a dashboard cross member mounted on a surface of the dashboard lower panel facing a cabin and extending in the vehicle width direction so that the dashboard lower panel and the dashboard cross member together form a closed cross section, and the dashboard cross member is joined to left and right wheel houses mounted on a surface of the dashboard lower panel facing an engine room with the dashboard lower panel sandwiched therebetween.

13. The vehicle front structure of claim 12, wherein the dashboard lower panel includes wheel house parts formed in a curved shape bulging toward the cabin to have increased rigidity and constituting rear parts of the wheel houses, and the dashboard cross member is joined to the wheel house parts.

14. The vehicle front structure of claim 12, wherein the dashboard lower panel is provided with, on one lateral side of the vehicle body, an accelerator pedal bracket for supporting an accelerator pedal, and a brake master cylinder mounting part for mounting thereon a brake master cylinder, and wherein the dashboard cross member is joined at one end to a corresponding one of the wheel houses with at least either of the accelerator pedal bracket and the brake master cylinder mounting part interposed therebetween.

15. The vehicle front structure of claim 12, wherein the dashboard lower panel is provided with, on the other lateral side of the vehicle body, a brake master cylinder mounting part for mounting thereon a brake master cylinder, and wherein, while the dashboard cross member is joined at one end to a corresponding one of the wheel houses, the dashboard cross member is joined at the other end to the other one of the wheel houses with the brake master cylinder mounting part interposed therebetween.

16. The vehicle front structure of claim 12, wherein the dashboard lower panel is provided with a supporting bracket for supporting vehicle-mounted parts including a steering hanger and a parking pedal, and the dashboard cross member is connected with the dashboard upper panel via the supporting bracket.

17. A vehicle front structure comprising:
a dashboard lower panel having opposite ends in a vehicle width direction joined to left and right front pillars;
a dashboard upper panel mounted on an upper part of the dashboard lower panel; and
left and right damper housings provided forward of the dashboard lower panel,
wherein the dashboard upper panel includes:
a front vertical wall extending substantially vertically in a height direction of a vehicle body;
a horizontal bottom wall extending from a lower end of the front vertical wall substantially horizontally in a longitudinal direction of the vehicle body; and
a rear inclined wall extending obliquely upward and rearward from a rear end of the horizontal bottom wall,
wherein the dashboard lower panel includes:
a vertical wall; and
an inclined flange formed at an upper end of the vertical wall, and
wherein the inclined flange is joined to a lower part of the rear inclined wall so that the dashboard upper panel is supported at substantially a center thereof in the longitudinal direction of the vehicle body from below by the vertical wall;
a cowl top mounted on an upper front part of the dashboard upper panel to form a space section extending in the vehicle width direction; and
a cowl reinforcing member provided within the space section to form a closed cross section extending in the vehicle width direction together with the front vertical wall and a front part of the horizontal bottom wall, wherein an upper edge of the dashboard lower panel is formed to fit along and joined to the rear inclined wall extending obliquely upward and rearward.

\* \* \* \* \*